United States Patent
Umapathy et al.

(10) Patent No.: US 11,963,051 B2
(45) Date of Patent: Apr. 16, 2024

(54) CONTEXT AWARE HANDOVERS

(71) Applicant: Intel Corporation, Santa Clara, CA (US)

(72) Inventors: Ashwin Umapathy, Hillsboro, OR (US); Akshaya Ravishankar, Hillsboro, OR (US); Sanket Vinod Shingte, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 692 days.

(21) Appl. No.: 17/024,301

(22) Filed: Sep. 17, 2020

(65) Prior Publication Data

US 2021/0007023 A1 Jan. 7, 2021

(51) Int. Cl.
*H04W 36/00* (2009.01)

(52) U.S. Cl.
CPC .. *H04W 36/00837* (2018.08); *H04W 36/0061* (2013.01)

(58) Field of Classification Search
CPC ....... H04W 36/0061; H04W 36/00837; H04W 64/00; H04W 36/32; H04W 36/0083; H04W 24/02
See application file for complete search history.

(56) References Cited

U.S. PATENT DOCUMENTS

| | | | | |
|---|---|---|---|---|
| 2011/0310840 A1* | 12/2011 | Kennedy | ............... | H04W 48/14 370/331 |
| 2014/0098786 A1* | 4/2014 | Yim | .................... | H04L 65/1094 370/331 |
| 2015/0094069 A1* | 4/2015 | Gopal | .................... | H04W 36/08 455/437 |
| 2022/0021469 A1* | 1/2022 | Veijalainen | ............ | H04B 17/29 |
| 2023/0016595 A1* | 1/2023 | Rydén | ............... | H04W 36/0083 |
| 2023/0025432 A1* | 1/2023 | Da Silva | ............... | H04W 36/36 |

FOREIGN PATENT DOCUMENTS

WO WO-2021064275 A1 * 4/2021

OTHER PUBLICATIONS

Vijaya et al., "5G Handover using Reinforcement Learning", publication date Sep. 1, 2020 (Year: 2020).*
Zhang et al., "Mobility Prediction: A Survey on State-of-the-Art Schemes and Future Applications" (Year: 2018).*

(Continued)

*Primary Examiner* — Dung Hong
(74) *Attorney, Agent, or Firm* — Schwabe, Williamson & Wyatt, P.C.

(57) ABSTRACT

Disclosed embodiments provide a handover prediction scheme that is based on contextual awareness of a compute node, such as a mobile device. The contextual information is used to predict network availability in a predicted target location, which is an area that a compute node is likely to travel. The use of sensors embedded in or accessible by the compute node may be used to carry out aspects of the embodiments. A reinforcement learning recommendation model is used to determine an optimal network, radio access technology, and/or network access node to connect with ahead of arriving at the predicted target location at a predicted arrival time. Other embodiments are described and/or claimed.

19 Claims, 9 Drawing Sheets

(56) References Cited

OTHER PUBLICATIONS

Alomari et al., "A Comprehensive Study of Wireless Communication Technology for the Future Mobile Devices," European Journal of Scientific Research, ISSN 1450-216X vol. 60 No. 4 (2011), pp. 583-591, © EuroJournals Publishing, Inc., Sep. 2011, website: http://www.eurojournals.com/ejsr.htm, 10 pages.

Qualcomm Incorporated, "LTE Mobility Enhancements," Feb. 2010, 10 pages.

Bargh et al., "Reducing Handover Latency in Future IP-based Wireless Networks: Proxy Mobile IPv6 with Simultaneous Bindings," 2008 International Symposium on a World of Wireless, Mobile and Multimedia Networks, IEEE, pp. 1-10 (Jun. 23, 2008).

Du et al., "A geographical location prediction method based on continuous time series Markov model," Plos One, Faculty of Information Technology, Beijing University of Technology, Beijing, China, Nov. 19, 2018, PLoS ONE 13(11): e0207063. https://doi.org/10.1371/journal.pone.0207063, 16 pages.

Mathew et al., "Predicting Future Locations with Hidden Markov Models", Proceedings of the 2012 ACM conference on ubiquitous computing pp. 911-918 (Sep. 5, 2012), available at: http://citeseerx.ist.psu.edu/viewdoc/download?doi=10.1.1.362.402&rep=rep1&type=pdf, Porto Salvo, Portugal, 8 pages.

Samy et al., "Fast Forced Handover Technique for Load Balancing in Mobile WiMAX for Real-time Applications," Elsevier, Procedia Computer Science 65 ( 2015 ) 901-910, International Conference on Communication, Management and Information Technology (ICCMIT 2015), ScienceDirect ,Available online at www.sciencedirect.com, 11 pages.

Ulukus et al., "Handover Delay in Cellular Wireless Systems," 1998 IEE International Conference on Communications (ICC'98) Conference Record, Affiliated with SUPERCOMM'98 (Cat. No. 98CH36220), vol. 3, pp. 1370-1374 (Jun. 7, 1998).

Xia et al., "Decision Tree-Based Contextual Location Prediction from Mobile Device Logs," Hindawi Mobile Information Systems, Apr. 1, 2018, vol. 2018, Article ID 1852861, https://doi.org/10.1155/2018/1852861, 12 pages.

Sutton et al., "Reinforcement Learning," An Introduction, Second Edition, Adaptive Computation and Machine Learning, Cambridge, Massachusetts, 2018, Identifiers: LCCN 2018023826 | ISBN 9780262039246, Classification: LCC Q325.6 .R45 2018 | DDC 006.3/1--dc23 LC, | DDC 006.3/1--dc23 LC record available at https://lccn.loc.gov/2018023826, 548 pages.

Alotaibi et al., "Rogue Access Point Detection: Taxonomy, Challenges, and Future Directions," Wireless Personal Communications • Oct. 2016, DOI: 10.1007/s11277-016-3390-x, Bridgeport, CT, 34 pages.

3GPP, "Technical Specification Group Radio Access Network; NR; NR and NG-RAN Overall Description; Stage 2 (Release 16)," 3GPP TS 38.300 V16.2.0 (Jul. 2020), 5G, 148 pages.

3GPP, "Technical Specification Group Radio Access Network; NR; Radio Resource Control (RRC) protocol specification (Release 16)," 3GPP TS 38.331 V16.1.0 (Jul. 2020), 5G, 906 pages.

\* cited by examiner

CONTEXT AWARE HANDOVERS

TECHNICAL FIELD

Embodiments described herein generally relate to edge computing, wireless communication, and communication system implementations, and in particular, to contextual based horizontal and vertical handover mechanisms.

BACKGROUND

In telecommunications and networking technologies, a hand-off or a handover (HO) refers to a process of transferring an ongoing communication session (e.g., voice or data) from one point of attachment to another point of attachment. HO is the process by which a mobile terminal (or user equipment (UE)) maintains a communication session as it crosses through the coverage areas of network access nodes (NANs) (e.g., a base station (BS), access point (AP), or the like) in one or more communication networks. HO usually takes place when, for example, a UE moves away from a coverage area provided by a first cell or NAN (often referred to as the "source cell" or the like), and enters a coverage area provided by a second cell or NAN (often referred to as the "target cell" or the like).

Horizontal HO (HHO) refer to an HO between NANs that implement the same type of network interface or the same Radio Access Technology (RAT). HHOs are sometimes referred to as "intra-technology" HOs or "intra-RAT" HOs. As an example, a UE may undergo an HHO from a source evolved NodeB (eNB) of an Third Generation Partnership Project (3GPP) Long Term Evolution (LTE) cellular network to a target eNB that is also part of the 3GPP LTE cellular network. This HO may still be considered to be an HHO even if the source and target eNBs are part of different wireless carriers (e.g., a roaming scenario). Another example of an HHO may involve a mobile station being handed off from a source Wireless Local Area Network (WLAN) AP to a target WLAN AP.

Vertical HO (VHO) involves an HO between NANs that implement different types of network interfaces or RATs. VHOs are sometimes referred to as "inter-technology" HOs or "inter-RAT" HOs. As an example, a UE may undergo a VHO from a source eNB in an LTE cellular network to a WLAN AP. VHOs can also take place between different cellular RATs such as between Universal Mobile Telecommunications System Terrestrial Radio Access Network (UTRAN), Global System for Mobile Communications (GSM)/Enhanced Data rates for GSM Evolution (GERAN), LTE (also referred to as "evolved UTRAN" or "E-UTRAN"), and/or 5th Generation (5G)/New Radio (NR) RATs.

The HHO process introduces some delay and/or latency that is sometimes perceptible by the user of the mobile station/UE. The amount of delay/latency caused by the HHO process may vary anywhere from few milliseconds to hundreds of milliseconds, which could depend on various factors such as the underlying RAT, environmental and/or radio conditions, and the like. VHOs can introduce even more delay or latency in comparison to HHOs at least due to the required interworking between the different RATs in addition to the delay/latency of HHOs.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
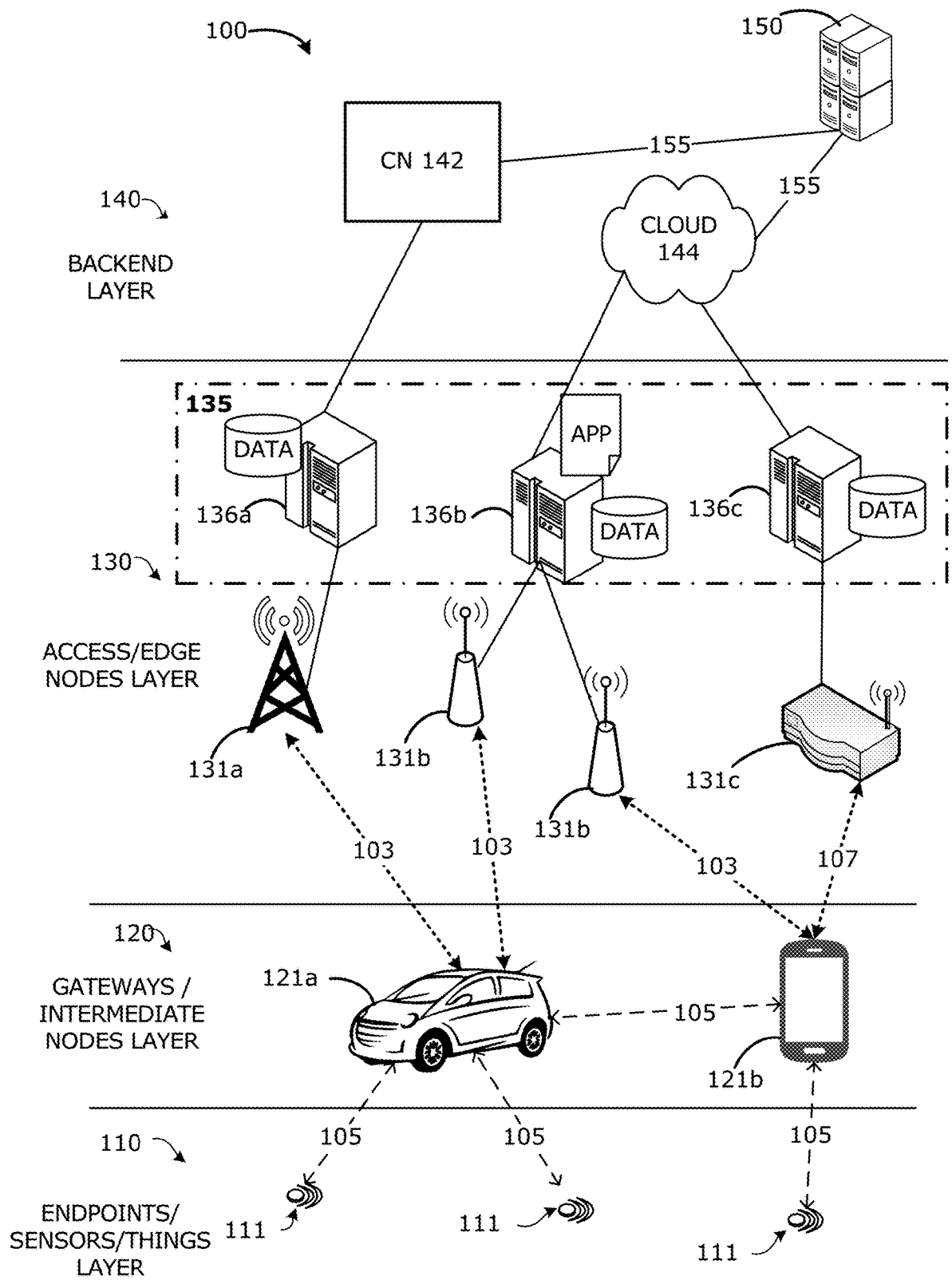
FIG. 1 illustrates an example edge computing environment in accordance with various embodiments.

The present disclosure describes a handover (HO) prediction scheme that is based on contextual awareness. "Contextual awareness" may involve predicting a target location based on a current position and/or time, as well as other parameters/data. The target location is a position/location where a computing device is likely to travel to, or intending to travel to. Machine learning (ML) and/or Artificial Intelligence (AI) models make recommendations about a target network, radio access technology (RAT), and/or network access node (NAN) for an HO using the predicted target location and known (e.g., a priori) information about the networks, network elements, and network quality in the predicted target location. This allows the computing system to proactively connect to a most optimal target network/NAN while a session is still in progress. And, when the connection with a source network/NAN eventually breaks, the computing system will have already connected to the optimal target network/NAN. This HO scheme may be referred to as a make before break (MBB) HO scheme, where MBB refers to a device or connection switching protocol in which a new connection path is established before the previous connection is broken or terminated.

The contextual information (also referred to as "context information") may be determined from sensor data from the multitude of sensors that are becoming quite prominent on modern mobile systems such as, for example, location/position data from "Always ON" location/positioning technologies and/or the like. The contextual information is also used to predict what the network availability will be in the predicted target location that the user is traveling to and a "smart" decision may be made on which network type, RAT type, and/or NAN type to connect to ahead of time. The HO process may be initiated based on the determined network type, RAT type, and/or NAN type for the predicted travel location. This allows the HO procedure to be initiated sooner than existing HO techniques, which reduces the delay and/or latency experienced by the UE and/or the delay/latency that is perceptible to the user.

In various embodiments, four components are used to make an optimal handover decision, including a context inference model (CIM), a digital vault or repository of available wireless networks, a network selection recommendation model, and an operating system (OS) policy manager. The CIM detects and/or predicts a semantic location/position using the UE's sensor data and this information is then used to query all available wireless networks and available NANs and their Quality of Service (QoS) parameters from the digital vault. The network selection model determines a recommended target network/NAN from among all the available candidate networks/NANs, and then provides the recommended network/NAN to the OS policy manager. The OS policy manager makes a final decision of which NAN to select and connect to ahead of time thereby enabling an efficient make-before-break model for HO. The embodiments may also be used for Always-ON sensing, device/user location tracking, and/or other like use cases. In some embodiments, these components may be implemented at the OS or application level, and operate on top of existing network protocol stacks.

The embodiments herein provide improved user experience, increased reliability, and network availability on modern mobile systems, especially in dynamic environments where switching often and between multiple wireless networks becomes inevitable. For example, the use-cases that 5G cellular networks will enable such as automated cars, and mission critical services will require no loss of connectivity even when transitioning between network types.

1. Example Edge Computing System Configurations and Arrangements

FIG. 1 illustrates an example edge computing environment 100 in accordance with various embodiments. FIG. 1 illustrates the different layers of communication occurring within the environment 100, starting from endpoint sensors or things layer 110 (e.g., operating in an Internet of Things (IoT) network topology) comprising one or more IoT devices 111 (also referred to as edge endpoints 110 or the like); increasing in sophistication to gateways or intermediate node layer 120 comprising one or more user equipment (UEs) 121a and 121b (also referred to as intermediate nodes 120 or the like), which facilitate the collection and processing of data from endpoints 110; increasing in processing and connectivity sophistication to access node layer 130 (or "edge node layer 130") comprising a plurality of network access nodes (NANs) 131a, 131b, and 131c (collectively referred to as "NANs 131" or the like) and a plurality of edge compute nodes 136a-c (collectively referred to as "edge compute nodes 136" or the like) within an edge computing system 135; and increasing in connectivity and processing sophistication to a backend layer 110 comprising core network (CN) 142 and cloud 144. The processing at the backend layer 140 may be enhanced by network services as performed by a remote application server 150 and/or other cloud services. Some or all of these elements may be equipped with or otherwise implement some or all aspects of the embodiments discussed herein.

The environment 100 is shown to include end-user devices, such as intermediate nodes 120 and endpoints 110, which are configurable or operable to connect to (or communicatively couple with) one or more multiple communication networks (also referred to as "access networks," "radio access networks," or the like) based on different access technologies (or "radio access technologies") for accessing application services. These access networks may include one or more of NANs 131. The NANs 131 are arranged to provide network connectivity to the end-user devices via respective links 103, 107 between the individual NANs and the one or more UEs 111, 121.

As examples, the communication networks and/or access technologies may include cellular technology such as LTE, MuLTEfire, and/or NR/5G (e.g., as provided by Radio Access Network (RAN) node 131a and/or RAN nodes 131b), WiFi or wireless local area network (WLAN) technologies (e.g., as provided by access point (AP) 131c and/or RAN nodes 131b), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The intermediate nodes 120 include UE 121a and UE 121b (collectively referred to as "UE 121" or "UEs 121"). In this example, the UE 121a is illustrated as a vehicle UE (vUE or V-ITS-S), and UE 121b is illustrated as a smartphone (e.g., handheld touchscreen mobile computing device connectable to one or more cellular networks). However, these UEs 121 may comprise any mobile or non-mobile computing device, such as tablet computers, wearable devices, PDAs, pagers, desktop computers, laptop computers, wireless handsets, unmanned vehicles or drones, and/or any type of computing device including a wireless communication interface.

The endpoints 110 include UEs 111, which may be IoT devices (also referred to as "IoT devices 111"), which are uniquely identifiable embedded computing devices (e.g., within the Internet infrastructure) that comprise a network access layer designed for low-power IoT applications utilizing short-lived UE connections. The IoT devices 111 are any physical or virtualized, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. As examples, IoT devices 111 may be abiotic devices such as autonomous sensors, gauges, meters, image capture devices, microphones, light emitting devices, audio emitting devices, audio and/or video playback devices, electro-mechanical devices (e.g., switch, actuator, etc.), EEMS, ECUs, ECMs, embedded systems, microcontrollers, control modules, networked or "smart" appliances, MTC devices, M2M devices, and/or the like. The IoT devices 111 can utilize technologies such as M2M or MTC for exchanging data with an MTC server (e.g., a server 150), an edge server 136 and/or edge computing system 135, or device via a PLMN, ProSe or D2D communication, sensor networks, or IoT networks. The M2M or MTC exchange of data may be a machine-initiated exchange of data.

The IoT devices 111 may execute background applications (e.g., keep-alive messages, status updates, etc.) to facilitate the connections of the IoT network. Where the IoT devices 111 are, or are embedded in, sensor devices, the IoT network may be a WSN. An IoT network describes an interconnecting IoT UEs, such as the IoT devices 111 being connected to one another over respective direct links 105. The IoT devices may include any number of different types of devices, grouped in various combinations (referred to as an "IoT group") that may include IoT devices that provide one or more services for a particular user, customer, organizations, etc. A service provider (e.g., an owner/operator of server 150, CN 142, and/or cloud 144) may deploy the IoT devices in the IoT group to a particular area (e.g., a geolocation, building, etc.) in order to provide the one or more services. In some implementations, the IoT network may be a mesh network of IoT devices 111, which may be termed a fog device, fog system, or fog, operating at the edge of the cloud 144. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 144 to Things (e.g., IoT devices 111). The fog may be established in accordance with specifications released by the OFC, the OCF, among others. In some embodiments, the fog may be a tangle as defined by the IOTA foundation.

The fog may be used to perform low-latency computation/aggregation on the data while routing it to an edge cloud computing service (e.g., edge nodes 130) and/or a central cloud computing service (e.g., cloud 144) for performing heavy computations or computationally burdensome tasks. On the other hand, edge cloud computing consolidates human-operated, voluntary resources, as a cloud. These voluntary resource may include, inter-alia, intermediate nodes 120 and/or endpoints 110, desktop PCs, tablets, smartphones, nano data centers, and the like. In various implementations, resources in the edge cloud may be in one to two-hop proximity to the IoT devices 111, which may result in reducing overhead related to processing data and may reduce network delay.

In some embodiments, the fog may be a consolidation of IoT devices 111 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

In embodiments, the fog may operate at the edge of the cloud 144. The fog operating at the edge of the cloud 144 may overlap or be subsumed into an edge network 130 of the cloud 144. The edge network of the cloud 144 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 136 or edge devices). The Fog layer resides on top of the edge layer and is a consolidation of networking devices such as the intermediate nodes 120 and/or endpoints 110 of FIG. 1.

Data may be captured, stored/recorded, and communicated among the IoT devices 111 or, for example, among the intermediate nodes 120 and/or endpoints 110 that have direct links 105 with one another as shown by FIG. 1. Analysis of the traffic flow and control schemes may be implemented by aggregators that are in communication with the IoT devices 111 and each other through a mesh network. The aggregators may be a type of IoT device 111 and/or network appliance. In the example of FIG. 1, the aggregators may be edge nodes 130, or one or more designated intermediate nodes 120 and/or endpoints 110. Data may be uploaded to the cloud 144 via the aggregator, and commands can be received from the cloud 144 through gateway devices that are in communication with the IoT devices 111 and the aggregators through the mesh network. Unlike the traditional cloud computing model, in some implementations, the cloud 144 may have little or no computational capabilities and only serves as a repository for archiving data recorded and processed by the fog. In these implementations, the cloud 144 centralized data storage system and provides reliability and access to data by the computing resources in the fog and/or edge devices. Being at the core of the architecture, the Data Store of the cloud 144 is accessible by both Edge and Fog layers of the aforementioned edge-fog network.

As mentioned previously, the access networks provide network connectivity to the end-user devices 120, 110 via respective NANs 131. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. In some embodiments, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. In these embodiments, the CRAN, CR, or vBBUP may implement a RAN function split, wherein one or more communication protocol layers are operated by the CRAN/CR/vBBUP and other communication protocol entities are operated by individual RAN nodes 131. This virtualized framework allows the freed-up processor cores of the NANs 131 to perform other virtualized applications, such as virtualized applications for the VRU/V-ITS-S embodiments discussed herein.

The UEs 121, 111 may utilize respective connections (or channels) 103, each of which comprises a physical communications interface or layer. The connections 103 are illustrated as an air interface to enable communicative coupling consistent with cellular communications protocols, such as Third Generation Partnership Project (3GPP) LTE, 5G/NR, Push-to-Talk (PTT) and/or PTT over cellular (POC), UMTS, GSM, CDMA, and/or any of the other communications protocols discussed herein. In some embodiments, the UEs 111, 121 and the NANs 131 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 111, 121 and NANs 131 may operate using LAA, enhanced LAA (eLAA), and/or further eLAA (feLAA) mechanisms. The UEs 121, 111 may further directly exchange communication data via respective direct links 105, which may be LTE/NR Proximity Services (ProSe) link or PC5 interfaces/links, or WiFi based links or a personal area network (PAN) based links (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols).

The UEs 111, 121 are capable of measuring various signals or determining/identifying various signal/channel characteristics. Signal measurement may be performed for cell selection, handover, network attachment, testing, and/or other purposes. The measurements collected by the UEs 111, 121 may include one or more of the following: a bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate (PLR), packet reception rate (PRR), Channel Busy Ratio (CBR), Channel occupancy Ratio (CR), signal-to-noise ratio (SNR), signal-to-noise and interference ratio (SINR), signal-plus-noise-plus-distortion to noise-plus-distortion (SINAD) ratio, carrier-to-interference ratio (CIR), peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between a NAN 131 reference time and a GNSS-specific reference time for a given GNSS), GNSS code measurements (e.g., The GNSS code phase (integer and fractional parts) of the spreading code of the $i^{th}$ GNSS satellite signal), GNSS carrier phase measurements (e.g., the number of carrier-phase cycles (integer and fractional parts) of the $i^{th}$ GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, Fast Initial Link Setup (FILS) discovery frames, or probe response frames for IEEE 802.11 WLAN/WiFi networks. Other measurements may be additionally or alternatively used, such as those discussed in 3GPP TS 36.214 v15.4.0 (2019-09), 3GPP TS 38.215, IEEE 802.11, Part 11: "Wireless LAN Medium Access Control (MAC) and Physical Layer (PHY) specifications, IEEE Std.", and/or the like. The same or similar measurements may be measured or collected by the NANs 131.

The UE 121*b* is shown to be configurable or operable to access an access point (AP) 131*c* via a connection 107. In this example, the AP 131*c* is shown to be connected to the Internet without connecting to the CN 142 of the wireless system. The connection 107 can comprise a local wireless connection, such as a connection consistent with any IEEE 802.11 protocol, wherein the AP 131*c* would comprise a WLAN (WiFi) router. In embodiments, the UEs 121 and IoT devices 111 can be configurable or operable to communicate using suitable communication signals with each other or with any of the AP 131*c* over a single or multicarrier communication channel in accordance with various communication techniques, such as, but not limited to, an orthogonal frequency division multiplexing (OFDM) communication technique, a single-carrier frequency division multiple access (SC-FDMA) communication technique, and/or the like, although the scope of the embodiments is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), etc.; or Quadrature Amplitude Modulation (QAM) such as M-QAM; and/or the like.

The connection 107 may operate according to a suitable IEEE 802.11 standard, which includes three frame types: management, control, and data. Management frames allow WLAN stations to initiate and maintain communications. Control frames govern the wireless links 107, allowing some stations to access the medium while denying access to other stations. Data frames convey higher-layer data. Connections are established using several management frame sub-types.

The first step of connection establishment is network discovery, which starts when the AP 131*c* advertises its existence by broadcasting beacon frames to stations 121, 111 in the vicinity. Stations 121, 111 passively listen to the beacon frames or actively send probe requests to identify APs 131*c* within range. After receiving a probe request, the AP 131*c* sends a probe response frame that contains information such as the supported rates and capabilities of the network. The second step involves the exchange of authentication and association messages. Authentication is the procedure of sending the identity of the station 121, 111 to the AP 131*c* through the authentication request frame. Upon receiving the request, the AP 131*c* either accepts or rejects the station 121, 111 via an authentication response. In an open authentication environment, no identity checking takes place. The association request is sent by the station 121, 111 to enable the AP 131*c* to allocate resources to the station 121, 111 and to synchronize with the network interface controller (NIC) of the station 121, 111. An association response sent by the AP 131*c* details the acceptance or rejection of the connection. Subsequently, the AP 131*c* and station 121, 111 can exchange data. Establishing secure communication may involve additional steps after the association stage, such as the exchange of four-way handshake messages for mutual authentication in WPA/WPA2-PSK or the provision of credentials to the authentication server (e.g., RADIUS) in an enterprise mode before the four-way handshake exchange.

HHOs in WLAN/WiFi networks take place when a mobile station 121, 111 moves away from an AP 131*c* that the station 121, 111 is camping on, which causes a disassociation to take place followed by a scan (e.g., to discover other AP(s) 131*c*), and then a re-attachment and re-authentication procedure is performed with a newly discovered AP 131*c*. After the authentication exchange, the station 121, 111 becomes authenticated, but is not associated. Sending a de-authentication message at this stage causes the station 121, 111 to become de-authenticated, whereas exchanging association frames places the station 121, 111 in an associated state, where the station 121, 111 is authenticated and associated and can exchange data. To terminate an established connection, the AP 131*c* disconnects one or all of the connected stations 121, 111 using the broadcast address by sending a de-authentication frame. Both the station 121, 111 and the AP 131*c* can send a disassociation frame to end the association. A disassociation frame received from a station 121, 111 allows the AP 131*c* to remove the station 121, 111 from an association table. The association procedure discussed previously is then performed to attach to a target AP 131*c*. As discussed in more detail infra, the stations 121, 111 may utilize the context aware HO mechanisms for both intra-WLAN HOs and inter-RAT HOs to/from WLAN AP 131*c* according to the various embodiments discussed herein.

The one or more NANs 131 that enable the connections 103 may be referred to as "RAN nodes" or the like. The RAN nodes 131*a-b* may comprise ground stations (e.g., terrestrial access points) or satellite stations providing coverage within a geographic area (e.g., a cell). The RAN nodes 131 may be implemented as one or more of a dedicated physical device such as a macrocell base station (BS), and/or a low power BS for providing femtocells, picocells or other like cells having smaller coverage areas, smaller user capacity, or higher bandwidth compared to macrocells. As examples, the RAN nodes 131 may be embodied as a NodeB, evolved NodeB (eNB), next generation eNBs (ng-eNBs), or a next generation NodeB (gNB), relay nodes, Radio Units (RUs), Remote Radio Heads (RRHs), Remote Radio Units (RRUs), Road Side Unites (RSUs), and/or the like. In one example implementation, the RAN node 131a is embodied as one or more gNB-Distributed Units (DUs) and/or one or more ng-eNB-DUs, and the RAN nodes 131b are embodied as one or more Radio Units (RUs) (also referred to as RRHs, RRUs, or the like) that are communicatively coupled with the DUs 131. In some implementations, the one or more RUs may be RSUs. In this example implementation, each DU 131 is communicatively coupled with a gNB-Central Unit (CU) or ng-eNB-CU (see e.g., 3GPP TS 38.401 v16.1.0 (2020-03)). The CU may be implemented as a Base Band Unit (BBU), Radio Equipment Controller (REC), Radio Cloud Center (RCC), centralized RAN (C-RAN), virtualized RAN (vRAN), and/or the like (although these terms may refer to different implementation concepts). Any other type of NANs can be used.

Any of the RAN nodes 131 can terminate the air interface protocol and can be the first point of contact for the UEs 121 and IoT devices 111. In some embodiments, any of the RAN nodes 131 can fulfill various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, etc. In embodiments, the UEs 111, 121 can be configurable or operable to communicate using OFDM communication signals with each other or with any of the NANs 131 over a multicarrier communication channel in accordance with various communication techniques, such as, but not limited to, an OFDMA communication technique (e.g., for downlink communications) and/or an SC-FDMA communication technique (e.g., for uplink and ProSe or sidelink communications), although the scope of the embodiments is not limited in this respect.

For most cellular communication systems, the RAN function(s) operated by the RAN or individual NANs 131 organize downlink transmissions (e.g., from any of the RAN nodes 131 to the UEs 111, 121) and uplink transmissions (e.g., from the UEs 111, 121 to RAN nodes 131) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 111, 121 at each transmission time interval (TTI). A TTI is the duration of a transmission on a radio link 103, 105, and is related to the size of the data blocks passed to the radio link layer from higher network layers.

Any of the RAN nodes 131 can terminate the air interface protocol and can be the first point of contact for the UEs 121 and IoT devices 111. In some embodiments, any of the RAN nodes 131 can fulfill various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, etc. In embodiments, the UEs 111, 121 can be configurable or operable to communicate using OFDM communication signals with each other or with any of the RAN nodes 131, 132 over a multicarrier communication channel in accordance with various communication techniques, such as, but not limited to, an OFDMA communication technique (e.g., for downlink communications) and/or an SC-FDMA communication technique (e.g., for uplink and ProSe or sidelink communications), although the scope of the embodiments is not limited in this respect. The NANs 131 may be configurable or operable to communicate with one another via respective interfaces or links (not shown), such as an X2 interface for LTE implementations (e.g., when CN 142 is an Evolved Packet Core (EPC)), an Xn interface for 5G or NR implementations (e.g., when CN 142 is an Fifth Generation Core (5GC)), or the like.

The UEs 111, 121 may generate and provide measurement reports (MRs) including measurement information to the NANs 131-132. The measurement information may include measurements of reference signals and/or any of the aforementioned types of measurements. A UE 111, 121 may undergo an HO operation when moving between cells or service coverage areas. For example, when a UE 111, 121 moves from a cell of a first NAN 131 to a cell of a second NAN 131, NAN 131 may handover the UE 111, 121 to NAN 131. In this case, NAN 131 may be considered a "source cell" or "source NAN," and NAN 131 may be considered a "target cell" or "target NAN." Typically, the source NAN 131 sends a measurement configuration to the UE 111, 121 to request an MR from the UE 111, 121 when certain configured reporting criteria is met, and the UE 111, 121 performs signal quality and/or cell power measurements for channels or links of the target NAN 131 and/or other neighboring cells. The reporting criteria are criteria that triggers the UE 111, 121 to send an MR, which can either be periodical or a single event description. Usually, the reporting criteria is a measurement result of a serving cell and/or neighboring cell(s) in comparison with a threshold parameter, where the measurement results may or may not be combined with hysteresis parameters and/or one or more positive or negative offsets.

Based on the measurement results, some configured events may trigger the UE 111, 121 to send the MR to the source NAN 131. The source NAN 131 may decide to handover the UE 111, 121 to the target NAN 131 by initiating the HO operation. To initiate the HO operation, the source NAN 131 may transmit an HO request message to the target NAN 131, and in response, the source NAN 131 may receive an HO request acknowledgement (ACK) from the target NAN 131. Once the HO request ACK is received, the source NAN 131 may send an HO command to the UE 111, 121 to begin an attachment process with the target NAN 131. At this point, the source NAN 131 stops data transmission to the UE 111, 121 since the UE 111, 121 detaches from the source NAN 131 and starts synchronization with the target NAN 132. If the source NAN 131 still has data intended for the UE 111, 121, the source NAN 131 may send a sequence number (SN) status transfer to the target NAN 131 and forward data to the target NAN 131 so that the target NAN 131 can transmit such data to UE 111, 121 once the HO operation is complete. As discussed in more detail infra, the UEs 121, 111 may utilize the context aware HO mechanisms for both intra-RAT HOs and inter-RAT HOs to/from NANs 131 according to the various embodiments discussed herein.

The NANs 131 are also communicatively coupled to CN 142. In embodiments, the CN 142 may be an evolved packet core (EPC) network, a NextGen Packet Core (NPC) network, a 5G core (5GC), or some other type of CN. The CN 142 may comprise a plurality of network elements, which are configurable or operable to offer various data and telecommunications services to customers/subscribers (e.g., users of UEs 121 and IoT devices 111) who are connected to the CN 142 via a RAN. The components of the CN 142 may be implemented in one physical node or separate physical nodes including components to read and execute instructions from a machine-readable or computer-readable medium (e.g., a non-transitory machine-readable storage medium). In some embodiments, Network Functions Virtualization (NFV) may be utilized to virtualize any or all of the above-described network node functions via executable instructions stored in one or more computer-readable storage mediums (described in further detail infra). A logical instantiation of the CN 142 may be referred to as a network slice, and a logical instantiation of a portion of the CN 142 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 142 components/functions.

The CN 142 is shown to be communicatively coupled to an application server 150 and a network 150 via an IP communications interface 155. The one or more server(s) 150 comprise one or more physical and/or virtualized systems for providing functionality (or services) to one or more clients (e.g., UEs 121 and IoT devices 111) over a network. The server(s) 150 may include various computer devices with rack computing architecture component(s), tower computing architecture component(s), blade computing architecture component(s), and/or the like. The server(s) 150 may represent a cluster of servers, a server farm, a cloud computing service, or other grouping or pool of servers, which may be located in one or more datacenters. The server(s) 150 may also be connected to, or otherwise associated with one or more data storage devices (not shown). Moreover, the server(s) 150 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 150 offer applications or services that use IP/network resources. As examples, the server(s) 150 may provide traffic management services, cloud analytics, content streaming services, immersive gaming experiences, social networking and/or microblogging services, and/or other like services. In addition, the various services provided by the server(s) 150 may include initiating and controlling software and/or firmware updates for applications or individual components implemented by the UEs 121 and IoT devices 111. The server(s) 150 can also be configurable or operable to support one or more communication services (e.g., Voice-over-Internet Protocol (VoIP) sessions, PTT sessions, group communication sessions, social networking services, etc.) for the UEs 121 and IoT devices 111 via the CN 142.

The cloud 144 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 144 include application capabilities type, infrastructure capabilities type, and platform capabilities type. A cloud capabilities type is a classification of the functionality provided by a cloud service to a cloud service customer (e.g., a user of cloud 144), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities.

Some cloud service categories that the cloud 144 may provide include, for example, Communications as a Service (CaaS), which is a cloud service category involving real time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; Function as a Service (FaaS) to the applications running in the edge devices (e.g., smartphones or IoT) to accelerate their workloads and applications; Acceleration FaaS (AFaaS) an FaaS implementation where functions are implemented and executed in a hardware accelerator, which may be used to further improve edge FaaS capability; Conflict Analysis as a Service (CAaaS); crypto-services (e.g., TLS-aaS, DTLS-aaS); Edge-as-a-Service (EaaS)Orchestration as a Service (OaaS); and/or other like cloud services including various anything-as-a-service (X-aaS) offerings.

In some embodiments, the cloud 144 may represent a network such as the Internet, a local area network (LAN) or a wide area network (WAN) including proprietary and/or enterprise networks for a company or organization, or combinations thereof. The cloud 144 may be a network that comprises computers, network connections among the computers, and software routines to enable communication between the computers over network connections. In this regard, the cloud 144 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, BSs, picocell or small cell BSs, backbone gateways, and/or any other like network device. Connection to the cloud 144 may be via a wired or a wireless connection using the various communication protocols discussed infra. More than one network may be involved in a communication session between the illustrated devices. Connection to the cloud 144 may require that the computers execute software routines which enable, for example, the seven layers of the OSI model of computer networking or equivalent in a wireless (cellular) phone network. Cloud 144 may be used to enable relatively long-range communication such as, for example, between the one or more server(s) 150 and one or more UEs 121 and IoT devices 111. In some embodiments, the cloud 144 may represent the Internet, one or more cellular networks, local area networks, or wide area networks including proprietary and/or enterprise networks, TCP/Internet Protocol (IP)-based network, or combinations thereof. In such embodiments, the cloud 144 may be associated with network operator who owns or controls equipment and other elements necessary to provide network-related services, such as one or more BSs or access points, one or more servers for routing digital data or telephone calls (e.g., a core network or backbone network), etc. The backbone links 155 may include any number of wired or wireless technologies, and may be part of a LAN, a WAN, or the Internet. In one example, the backbone links 155 are fiber backbone links that couple lower levels of service providers to the Internet, such as the CN 112 and cloud 144.

In embodiments, the edge compute nodes 136 may include or be part of an edge system 135 (or edge network 135). The edge compute nodes 136 may also be referred to as "edge hosts 136" or "edge servers 136." The edge system 135 includes a collection of edge servers 136 and edge management systems (not shown by FIG. 1) necessary to run edge computing applications within an operator network or a subset of an operator network. The edge servers 136 are physical computer systems that may include an edge platform (e.g., MEC platform) and/or virtualization infrastructure, and provide compute, storage, and network resources to edge computing applications. Each of the edge servers 136 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to intermediate nodes 120 and/or endpoints 110. The VI of the edge servers 136 provide virtualized environments and virtualized resources for the edge hosts, and the edge computing applications may run as VMs and/or application containers on top of the VI. One example implementation of the edge system 135 is a MEC system/network that may operate in accordance with ETSI GS MEC 003 V2.1.1 (2019-01) and/or other like ETSI MEC standards. It should be understood that MEC system and service deployment examples are only one illustrative example of edge computing systems/networks 135, and the example embodiments discussed herein may be applicable to many other edge computing/networking technologies in various combinations and layouts of devices located at the edge of a network. Examples of such other edge computing/networking technologies that may implement the embodiments herein include Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing systems; Central Office Re-architected as a Datacenter (CORD), mobile CORD (M-CORD) and/or Converged Multi-Access and Core (COMAC) systems; and/or the like. Further, the techniques disclosed herein may relate to other IoT/edge network systems and configurations, and other intermediate processing entities and architectures may also be used to practice the embodiments herein.

Computational task and/or workload offloading opportunities may be based on compute node capabilities of the edge compute nodes 136 and/or the UEs 111, 121. The compute node capabilities may include, for example, configuration information (e.g., a hardware platform make and model, hardware component types and arrangement within the hardware platform, associated peripheral and/or attached devices/systems, processor architecture, currently running operating systems and/or applications and/or their requirements, subscription data (e.g., data plan and permissions for network access), security levels or permissions (e.g., possible authentication and/or authorization required to access the edge compute nodes 136 or particular resources), etc.); computational capacity (e.g., a total processor speed of one or more processors, a total number of VMs capable of being operated by the edge compute nodes 136, a memory or storage size, an average computation time per workload, a reuse degree of computational resources, etc.); current or predicted computational load and/or computational resources (e.g., processor utilization or occupied processor resources, memory or storage utilization, etc.); current or predicted unoccupied computational resources (e.g., available or unused memory and/or processor resources, available VMs, etc.); network capabilities (e.g., link adaptation capabilities, configured and/or maximum transmit power, achievable data rate per channel usage, antenna configurations, supported radio technologies or functionalities of a device (e.g., whether a compute node supports a particular RAT; whether an (R)AN node 131 supports LTE-WLAN aggregation (LWA) and/or LTE/WLAN Radio Level Integration with IPsec Tunnel (LWIP), etc.), subscription information of particular compute node or user, etc.); energy budget (e.g., battery power budget); and/or other like capabilities. In addition to being used for computational offloading, the compute node capabilities of UEs 111, 121, NANs 131, and/or edge compute nodes 136 may be used as parameters for selecting a predicted target location for a context aware HO as discussed herein.

As shown by FIG. 1, each of the NANs 131a, 131b, and 131c are co-located with edge compute nodes (or "edge servers") 136*a*, 136*b*, and 136*c*, respectively. These implementations may be small-cell clouds (SCCs) where an edge compute node 136 is co-located with a small cell (e.g., pico-cell, femto-cell, etc.), or may be mobile micro clouds where an edge compute node 136 is co-located with a macro-cell (e.g., an eNB, gNB, etc.). The edge compute node 136 may be deployed in a multitude of arrangements other than as shown by FIG. 1. In a first example, multiple NANs 131 are co-located or otherwise communicatively coupled with one edge compute node 136. In a second example, the edge servers 136 may be co-located or operated by RNCs, which may be the case for legacy network deployments, such as 3G networks. In a third example, the edge servers 136 may be deployed at cell aggregation sites or at multi-RAT aggregation points that can be located either within an enterprise or used in public coverage areas. In a fourth example, the edge servers 136 may be deployed at the edge of CN 142. These implementations may be used in follow-me clouds (FMC), where cloud services running at distributed data centers follow the UEs 121 as they roam throughout the network.

In any of the aforementioned embodiments and/or implementations, the edge compute nodes 136 provide a distributed computing environment for application and service hosting, and also provide storage and processing resources so that data and/or content can be processed in close proximity to subscribers (e.g., users of UEs 121, 111) for faster response times The edge servers 136 also support multitenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 136 from the UEs 111, 121, CN 142, cloud 144, and/or server(s) 150, or vice versa. For example, a device application or client application operating in a UE 121, 111 may offload application tasks or workloads to one or more edge servers 136. In another example, an edge server 136 may offload application tasks or workloads to one or more UE 121, 111 (e.g., for distributed ML computation or the like).

Furthermore, the various servers discussed herein, such as the edge servers 136, one or more servers forming the cloud 144, and/or the servers 150 may be any box or enclosure including various computer hardware components. The various servers discussed herein may include various computer devices with rack computing architecture component(s), tower computing architecture component(s), blade computing architecture component(s), and/or other like hardware components in a suitable hardware configuration. Each of the servers shown and described with respect to FIG. 1 (and/or shown and described in other sections of the present disclosure) may represent a cluster of servers, a server farm, a cloud computing service (e.g., cloud 144), or other grouping or pool of servers, which may be located in one or more datacenters and/or at a network's edge.

2. Contextual and/or Semantic Handover Embodiments

HHOs are hand-off HOs from a source NAN 131 to a target NAN 131 that implement the same type of network interface or RAT, and VHOs are HOs from a source NAN 131 to a target NAN 131 that implement different network interfaces or RATs. Typically, in cellular network technologies such as 3GPP systems, HHOs are network initiated, which means that the network makes an HO decision based on a measurement report provided by a UE 111, 121. The HO decision involves a source RAN node 131 determining a target cell to hand the UE 111, 121 off to, and triggering the HO from the source cell to the target cell. The signal strength from the UE 111, 121, as indicated by the measurement report and/or as perceived at the source RAN node is used to make the HO decision. HHOs in WiFi networks take place when a mobile station 111, 121 moves away from an AP 131*c* that the mobile station 111, 121 is camping on, which causes a disassociation to take place followed by a scan (e.g., to discover AP(s)), and then a re-attachment and re-authentication procedure with a newly discovered AP takes place.

For both of these RATs, the HHO process introduces some delay and latency that is sometimes perceptible by the user of the mobile station/UE. The amount of delay/latency caused by the HHO process may vary anywhere from few milliseconds to hundreds of milliseconds, which could depend on various factors such as the underlying RAT, environmental and/or radio conditions, and the like.

VHOs can introduce even more delay or latency in comparison to HHOs. The amount of delay/latency involved may be based on whether any interoperability mechanisms exist. For example, a VHO from UTRAN to E-UTRAN may experience less delay than a VHO between 3GPP and WiFi systems because 3GPP has standardized some inter-RAT HO procedures between different 3GPP RATs. When it comes to VHO scenarios involving different standardized technologies, such as 3GPP and WiFi networks, performing efficient handover between heterogeneous networks becomes a significant challenge due to the fundamental differences in the underlying RATs. When switching between heterogeneous networks, extensive configuration is required at multiple layers of the networking model including the network layer, transport, session, and application layers, which invariably results in significant HO latencies. This makes for a poor user experience and causes loss of network connectivity in many cases. For example, on a modern Windows® based mobile platform, a vertical handover from a WLAN to a Wireless Wide Area Network (WWAN) takes several seconds (e.g., approximately 7 seconds).

Another common problem with both HHOs and VHOs involves incorrect HO decisions being made. Such non-ideal (or "false") HO decisions can take place when, for example, the UE/station is near the edge of a network availability zone (e.g., a cell's edge). This can result in repeated back-to-back handovers (also referred to as a "ping-pong") from one network to another, within a short period of time is a common problem on many mobile systems.

Existing mechanism for making HO decisions include forced HOs, static HOs, and predictive HOs. A forced HO is an HO forced to occur at a "planned" moment where, instead of guessing or predicting the time to perform an HO, the HO is forced at a predetermined time. Forced HOs may take place due to, for example, disassociation from an AP or BS, a station/UE user manually switching to a different WiFi or cellular network, a station/UE user manually switching off one RAT interface forcing the station/UE to scan for a NAN 131 using a different interface (e.g., the user turning off a cellular interface forcing the station/UE to scan for a WiFi AP). Forced HOs have a considerable latency impact and could result in complete loss of connectivity for an extended duration. The impact is especially significant if a Network Interface Card (NIC)/RAT circuitry needs to be re-initialized by loading firmware and/or brining up software stacks to a functional state from inactive or idle state. Operating systems try to minimize this impact by keeping multiple RAT circuitries/NICs active and falling back to one when the other disconnects. However, this results in increased power consumption due to two NICs being active at the same time. Many mobile system keep cellular and WiFi interface circuitries active simultaneously, even though only one interface is actively being used. This is done to ensure a fallback option in the event of forced handovers, for example falling back to cellular when WiFi disconnects. This design is inefficient and wastes power.

Static threshold based HO is a conventional HO strategy that uses a predefined set of static thresholds, such as signal strength and/or quality measurements, power levels, network bandwidth, jitter, interference measurements, etc., as indicators of link quality. The HO decision is based on the perceived link quality that gets re-evaluated at a certain fixed interval or in response to measurement data dropping below the threshold(s). Research work in this area has shown that it might be beneficial to use a combination of static thresholds such as signal strength measurements, network bandwidth measurements, etc., to more accurately determine link quality. Others have recommended applying a mathematical function such as weighted average or hysteresis margin for HHOs and VHOs. Regardless of how effective these schemes are in determining when the link quality degrades, they are hamstrung by the fact that they are reactive in nature. That is, by the time an HO decision is made, the connection to the NAN 131 could have been lost or could have deteriorated significantly (e.g., when the station/UE 111, 121 is moving faster than an average walking pace). As a result, static threshold based HO schemes cannot guarantee uninterrupted connectivity or quality of service (QoS) during the HO process.

Prediction based HOs use a combination of channel parameters such as signal strength/quality, latency, bit rate, and other like measurements to predict the next closest NANs with the best QoS. There are several prediction based schemes that have been researched over the years. All prediction based HO schemes make use of some combination of channel parameters to predict the QoS of nearby NANs. This has the inherent disadvantage that the prediction will not work if the NAN 131 is undiscovered or unknown. For example, when a station/UE is traveling between two buildings, unless a scan is triggered, a NAN 131 in the new building will not be discovered and the prediction scheme will not account for this new wireless network.

Figure 2:
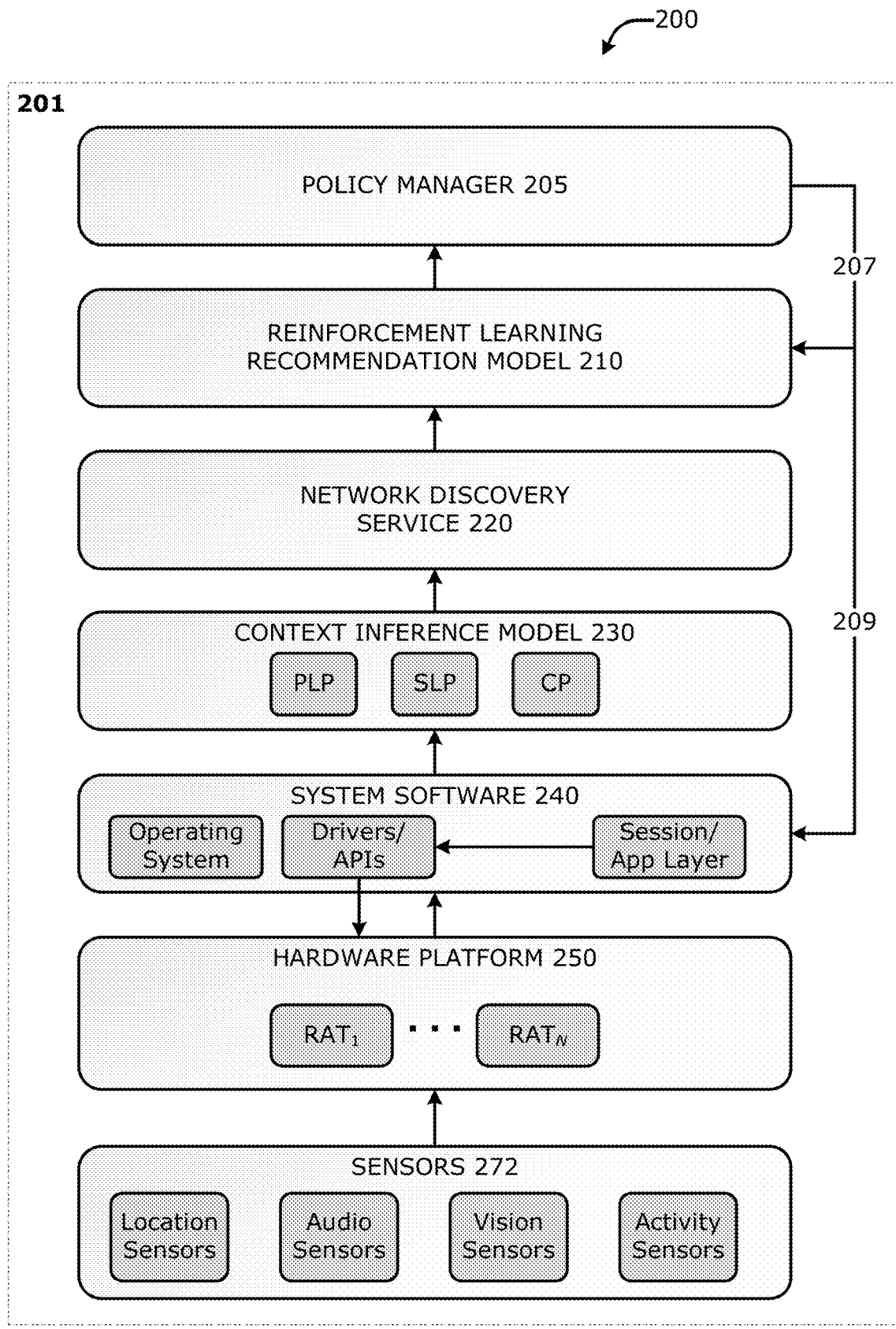
FIG. 2 illustrates an example arrangement in which various embodiments may be practiced.

FIG. 2 illustrates an example arrangement 200 according to various embodiments. The example arrangement 200 may be implemented in a computing system 201, which may be the same or similar as edge endpoints 110, intermediate nodes 120, and/or the NANs 131 discussed infra with respect to FIG. 1, the edge computing node 850 discussed infra with respect to FIG. 8, and/or any other any other computing system/device discussed herein.

The computing system 201 includes one or more sensors 272, a hardware platform 250, and system software 240. The one or more sensors 272 are discussed in more detail infra, and may be the same or similar to sensors 872 of FIG. 8. The hardware platform 250 includes one or more RAT interfaces (e.g., $RAT_1$ to $RAT_N$ depicted by FIG. 2, where N is a number) as well as various other hardware elements such as those discussed infra with respect to FIG. 8. The system software 240 includes the system's 201 operating system (OS), a session/application (app) layer entity, and various drivers or application programming interfaces (APIs) for accessing individual hardware components of the hardware platform 250 and sensor data captured/generated by the one or more sensors 272.

The session/app layer entity may trigger or initiate context aware HOs, which may involve initializing individual RAT interfaces in the hardware platform 250. The session/app layer entity may include a session layer entity (e.g., layer 5 of the Open Systems Interconnection (OSI) model) and/or an application layer entity (e.g., layer 7 of the OSI model). The session layer is responsible for establishing, maintaining, and terminating communication sessions between applications and/or devices. The communication sessions include sending and receiving service requests and responses using a suitable session layer protocol such as OSI session-layer protocol (X.225, ISO 8327), Session Control Protocol (SCP), Remote Procedure Call (RPC) protocol, Zone Information Protocol (ZIP), Real-time Transport Control Protocol (RTCP), Short Message Peer-to-Peer (SMPP), and/or the like. The app layer that users and application processes access network services. The Application layer is responsible for interacting directly with software apps and transferring data between clients and servers, determining resource availability, synchronizing communication, and the like using a suitable application layer protocol such as Telnet, Domain Name System (DNS), Simple Mail Transfer Protocol (SMTP), Hypertext Transfer Protocol (HTTP), among many others. In various embodiments, an entity in the session layer or the application layer may trigger the context aware HO in response to detecting an HO trigger event by accessing a RAT interface of a selected target network/NAN using a driver or API for that RAT interface.

The example arrangement 200 includes a context inference model (CIM) 230 that uses sensor data from the one or more sensors 272 to determine contextual information of the computing system 201. The CIM 230 may obtain the sensor data from the sensors 272 via the hardware platform 250 using the drivers/APIs of the system 240. The CIM 230 uses the sensor data to determine/generate a Physical Location Prediction (PLP), a Semantic Location Prediction (SLP), and a Context Prediction (CP), which are described in more detail infra with respect to FIG. 3. The CIM 230 also predicts a next target location of the computing system 201 using a combination of sensor data collected by the sensors 272 and the collected/compiled context information.

For example, the CIM 230 may use location/position sensors to determine current physical position and/or location of the computing system 201. The location/position sensors may include positioning circuitry (e.g., positioning circuitry 845 of FIG. 8) as well as various sensors 272 that may be used for an indoor positioning system (IPS) such as, for example, WLAN (e.g., WiFi) radiofrequency (RF) circuitry, Bluetooth RF circuitry, LiFi circuitry (e.g., light based wireless communication circuitry), or other personal area network circuitry to determine distance measurements to nearby anchor nodes (e.g., Bluetooth beacons, WiFi beacons or routers, LiFi beacons or routers, Ultra-Wideband beacons, etc.) with known fixed positions. Magnetic positioning using magnetometers and/or dead reckoning techniques may also be used for the IPS. In some embodiments, inertial measurements using the activity sensors may be used for location/position determination. In some embodiments, positioning based on visual markers or known visual features may be used based on vision sensor data from the vision sensors. Additionally or alternatively, acoustic positioning techniques may be used based on audio data obtained from the audio sensors. In various embodiments, the CIM 230 may use input from audio sensors, vision sensors, and activity sensors (e.g., motion and/or acceleration analysis based on sensor data from accelerometers, gyroscopes, etc.) to determine additional context information (e.g., how secure the current location is, speed of movement/travel, and/or the like). The sensors 272 may be the same or similar to the sensors 822 of FIG. 8 discussed infra.

The network discovery service (NDS) 220 queries a digital repository for network information of available wireless networks (see e.g., repositories 403 of FIG. 4) based on the coordinates of the target location to determine networks in and/or around the target location, the coverage areas (or effective coverage areas) of the determined networks, and/or other QoS/quality of experience (QoE) related parameters. In some embodiments, the NDS 220 may obtain some network information, such as measurement data, configurations, etc., from baseband circuitry of the computing system 201 or from NANs 131 via the baseband circuitry of the computing system 201. In some embodiments, the network information about the available networks can be cached locally in the computing system 201 using a suitable caching system. The network information is then provided to the Reinforcement Learning Recommendation Model (RLRM) 210 with (or as a part of) the context information provided by the CIM 230.

The RLRM 210 takes the context information (from CIM 230) and the network information (from NDS 220) and makes a decision on which HO target 209 (e.g., network type, RAT type, specific NAN 131, etc.) to connect to that will have the best or optimal QoS and/or QoE given the predicted target location. Reinforcement Learning (RL) is a machine learning (ML) paradigm concerned with how software agents (or AI agents) ought to take actions in an environment in order to maximize a numerical reward signal. In general, RL involves an agent taking actions in an environment that is/are interpreted into a reward and a representation of a state, which is then fed back into the agent.

In embodiments, the RLRM 210 can be modeled using two RL objects: an Environment and an Agent. The Agent is the learner and decision maker in the RLRM 210. The Environment comprises everything outside the Agent that the Agent interacts with. The Agent and Environment continually interact with one another, wherein the Agent selects actions to be performed and the Environment responds to these Actions and presents new situations (or states) to the Agent. The Environment also gives rise to rewards, which are numerical values that the Agent seeks to maximize over time through its choice of actions. As discussed in more detail infra, the computing system 201 may be considered to be the environment for purposes of the present disclosure.

In some implementations, the RLRM 210 can be modeled as a Markov decision process (MDP) (e.g., a discrete-time stochastic control process) including a set of Environment and Agent states, S; a set of actions, A, of the Agent; a probability of transition (at time t) from state s to state s' under action a, which can be expressed as $P_a(s,s')=Pr(s_{t+1}=s'|s_t=s, a_t)$; the immediate reward after the transition from state s to state s' with action a, which can be expressed as $R_a(s,s')$; and rules (or policy) that describe what the Agent is to observe.

In some implementations, the RLRM 210 may be, or may include, a model of the environment. The model of the environment is a data structure that mimics the behavior of an environment, which allows inferences to be made about how the environment will behave. For example, given a state and action, the model might predict a resultant next state and a next reward. Models are used for planning, which allows the RLRM 210 to determine a course of action by considering possible future situations before they are actually experienced. Methods for solving reinforcement learning (RL) problems that use models and planning are called model-based methods, as opposed to simpler model-free methods that are explicitly trial-and-error learners. Various aspects of the RLRM 210 are discussed in Sutton et al., "Reinforcement Learning: An Introduction", 2nd Ed., The MIT Press, Cambridge Mass. (19 Oct. 2018).

A policy manager 205 eventually makes the decision to choose an appropriate HO target 209 (e.g., specific network type, RAT type, carrier (if applicable), specific target NAN 131, etc.) based on the recommendation results from the RLRM 210, and a policy. In the context of reinforcement learning (RL), a policy defines an RL Agent's way of behaving at a given time. In general, a policy is a mapping from perceived states of an Environment to actions to be taken when the system 201 is in those states. In some implementations, the policy may be a function, a lookup table, or may involve an extensive search process. The decision made by the policy manager 205 is then provided as feedback 207 to the RLRM 210 to improve prediction accuracy for future recommendations, and to tailor the RLRM 210 to the user's specific behaviors and/or movement patterns. In the parlance of RL, the feedback 207 may be a type of reward value that positively or negatively affects the behavior of the RLRM 210.

In some embodiments, the policy manager 205 may add a score to the various options (e.g., candidate networks) based on various factors (e.g., user-selected or set priority, available/remaining battery on the computing system 201, security features of each candidate network, size and/or type of data transfers taking place during the session or when the HO is to occur, traffic QoS classification as indicated by the differentiated services code point (DSCP) in the differentiated services (DS) field in the IP header of IP packets, subscription data, etc.) before making a final decision on whether to perform an HHO or VHO, or not. In some implementations, the policy manager 205 may run inside the operating system (OS) of the computing system 201.

The policy manager 205 may also provide the selected HO target 209 (e.g., target network, target RAT, or target NAN 131) to the system software 240 for triggering or initiating the HO to the selected HO target 209. In one example, the selected HO target 209 is provided to the OS or session/app entity in the form of a configuration, and the OS or session/app entity triggers the HO from an HO source (e.g., source network, source NAN, etc.) to the selected HO target 209 in response to detecting various HO criteria or trigger conditions. When the HO criteria or trigger conditions are detected, the OS or session/app entity may initialize or switch on the RAT interface.

In one example, the HO criteria or trigger conditions may include detecting the system 201 arriving at or near the predicted target location or detecting the system 201 approaching (e.g., travelling to) the predicted location. In this example, the OS or session/app entity may use sensor data from one or more sensors 272 to detect the approach towards or arrival at or near the predicted target location, and this sensor data may be obtained using a suitable driver or API. In another example, the HO criteria or trigger conditions may include detecting a signal strength of the target NAN 131 meeting or exceeding a threshold. In some embodiments, this signal strength threshold may be less than the thresholds configured by, for example, a cellular network so that the HO can be initiated earlier than would normally take place. In this example, the OS or session/app entity may use a suitable driver or API to access measurement data from cellular RAT circuitry. Other HO criteria and/or trigger conditions may be used in other embodiments. For example, the HO criteria and/or trigger conditions may include a semantic location, a system or a combination of semantic location and system context.

In some embodiments, the policy manager 205 gives the OS or the user the ability to pick a target network, target RAT, and/or target NAN 131. In one example, the policy manager 205 provides the selected HO target 209 to the OS or session/app entity, which displays a notification indicating the selected HO target 209. A user of the system 201 may indicate whether to use the selected HO target 209 or a different target using user interface elements. This selection can be used as the target for the HO criteria and/or trigger conditions mentioned previously. Additionally, the selection can be provided to the RLRM 210 as feedback 207 for future predictions. This allows OS or user preferences to be taken into consideration for the target selection. For example, if the battery of the computing system 201 is running low, then the user or an OS configuration/policy may indicate to avoid connecting with a cellular network because the cellular radio circuitry may consume more power than using, for example, WLAN RAT circuitry. In this example, if the cellular radio circuitry is turned off, then the OS or the user may override the provided recommendation and instead pick a WiFi network. In another example, the policy manager 205 may recommend switching to a cellular network because the cellular network has a best QoS for a predicted location at a particular time, but the user of the computing system 201 may prefer using a WLAN network with a lower QoS to avoid reaching a data cap of his/her cellular network subscription plan. In these examples, the user or OS selection may be provided as the feedback 207 (or part of the feedback 207) to the RLRM 210.

The implementation of the embodiments herein may be split between the OS, platform, and device firmware. In these implementations, the platform and OS documentation may need to include descriptions of the context awareness capabilities, depending of the specific platform and/or configuration.

Figure 3:
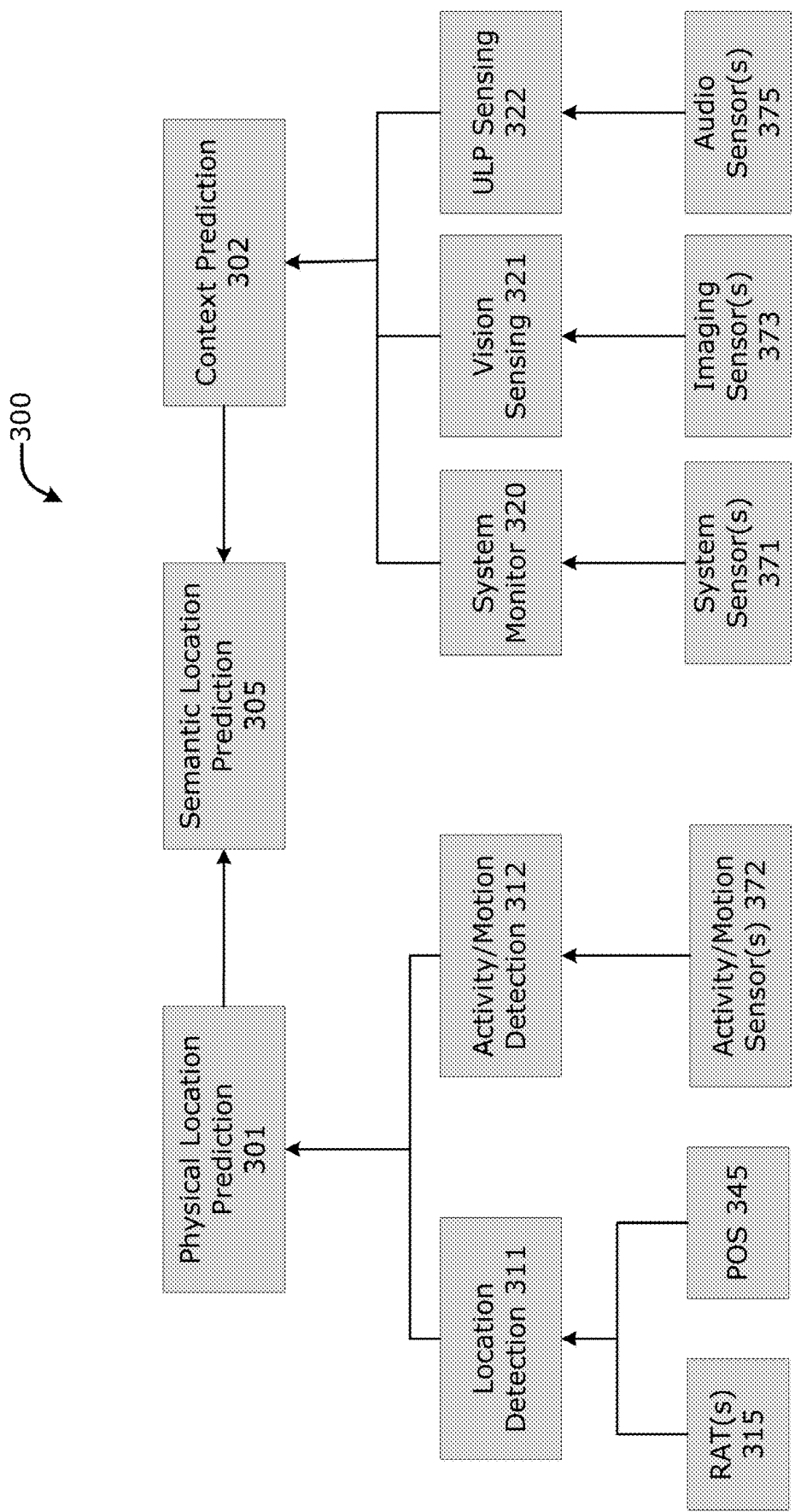
FIG. 3 illustrates an example components that make up the context inference model according to various embodiments.

FIG. 3 illustrates an example components of a CIM 300 according to various embodiments. The CIM 300 may be the same or similar as the CIM 230 of FIG. 2. In addition to predicting the target physical location, the CIM 300 gathers as much information as necessary to be context aware as the computing system 201 moves from one location to another, and/or based on other aspects of the computing system 201. In any of the embodiments discussed herein, the CIM 300 may leverage industry standard solutions and algorithms for location detection 311, motion detection 312, system monitor 320, vision sensing 321, and User-Language Processing (ULP) sensing 322. The CIM 300 may use additional or alternative sensing mechanisms in other embodiments.

In embodiments, the CIM 300 generates a semantic location prediction (SLP) 305 based on a physical location prediction (PLP) 301 and a context prediction (CP) 302. The PLP 301 is based on location detection 311 and/or motion detection 312, and the CP 302 is based on system monitoring 320, vision sensing 321, and/or ULP 322.

The PLP 301 involves predicting a location of the computing system 201 at a next moment or at some time instance in the future. The PLP 301 can use location detection 311 data and/or motion detection 312 data to predict a future location of the computing system 201. For example, a Hidden Markov Model (HMM), trajectory data mining, Continuous Time Series Markov Model (CTS-MM), k-nearest neighbor, Bayesian statistical analysis, Kalman filtering, and/or other like techniques can be used for the PLP 301.

The location detection 311 refers to detecting a physical location of the computing system 201 (e.g., geolocation coordinates, address, or the like). The location detection 311 may utilize location/positioning data from, for example, one or more RAT circuitries 315, positioning circuitry (POS) 345 (e.g., GNSS chip, or the like), and/or an IPS (not shown). As examples, the one or more RAT circuitries 315 may include WiFi transceiver circuitry, Personal Area Network (PAN) transceiver circuitry, cellular baseband circuitry, various RF chips, and/or the like. The one or more RAT circuitries 315 may be the same or similar to transceiver 866 of FIG. 8, and the POS 345 may be the same or similar as positioning circuitry 845 of FIG. 8. In one example, location detection 311 may utilize location/positioning data from a cellular network via the cellular baseband circuitry, where the location/positioning data is based on LTE Positioning Protocol (LPP) as discussed in 3GPP TS 36.355 v16.0.0 (2020-07-24). In another example, GNSS coordinates can be obtained from the POS 345. Additionally or alternatively, other positioning techniques, such as trilateration, triangulation, dead reckoning, may be used for location detection 311.

The motion detection 312 refers to detecting a mobility (e.g., travel direction and/or travel velocity) of the computing system 201. Motion detection 312 detects motion/activity of the computing system 201 using sensor data from one or more activity and/or motion sensors 372. As examples, the activity sensors 372 may include accelerometers, gyroscopes, magnetometers, barometers, proximity sensors (e.g., optical, magnetic, sonar-based, ultrasonic, etc.), and/or other like motion and/or activity sensors. The one or more activity/motion sensors 372 may be the same or similar to the sensors 872 of FIG. 8. In addition, various models such as, for example, Dynamic Time Warping (DTF), Principal Component Analysis (PCA), Cumulative Distribution Function (CDF), Cumulative Sum (CUSUM), and/or Markov models such as HMMs can be used to determine the motion/activity of the computing system 201 for the motion/activity detection 312 based on the sensor data obtained from the one or more activity/motion sensors 372.

The CP 302 predicts a system context of the computing system 201 based on a current system context. The system context of the computing system 201 (also referred to as "contextual information" or simply "context") may be any type of information about how the computing system 201 is operating and/or the conditions under which the computing system 201 is operating. The system context may include or indicate a system state of the computing system 201, physical environment of the computing system 201, and/or networking environment of the computing system 201. In various embodiments, the context may include other information, both outside and inside the computing system 201, data, and/or conclusions that may be drawn from that information and data The system state information may include or indicate data about the operation of the computing system 201 such as, for example, hardware performance metrics such as power consumption, processor performance, memory and/or storage utilization and/or free space, component load, battery state such as available power, and/or thermal data; OS and/or application parameters and requirements such as computational needs, input/output characteristics, and volume of exchanged data (upload or download); overload conditions experienced by the computing system 201; and/or the like.

The physical environment information may include or indicate data about an environment surrounding the computing system 201 such as, for example, current (outside) temperature, humidity, moisture, altitude, ambient light, ambient sound/volume, information/data related to geographic objects (e.g., mountains) and/or human-created objects (e.g., buildings, highways, etc.), weather data for a given location, and/or other like environmental measurements.

The networking environment information may include or indicate data about a networks that the computing system 201 is connected to, or is capable of connecting to. This information may include, for example, radio and/or channel state conditions (e.g., quality of links 103 and/or 105 of FIG. 1); network connectivity metrics; data transfer rates; network and/or session parameters (e.g., network ID/addresses, session ID, port numbers, etc.); amount of data received over a network; security aspects of a currently attached network; and/or the like.

In some embodiments, the contexts may be based on a pre-assessment of an operational state of the computing system 201, which may be based on previously indicated contexts. This may involve, for example, evaluating both computation and communication resources needed for different data transfers, threshold criteria or a desired level of reliability, amount or type of compute node capabilities (e.g., a certain processor speed, memory/storage capacity, RAT circuitries implemented by the computing system 201, etc.), type of operational constraints under which the computing system 201 is operating (e.g., radio conditions and/or link quality, a surrounding environmental conditions (e.g., temperature, humidity, altitude, etc.), component temperature, etc.), and/or the like.

The system monitor 320 monitors system resources and performance of the computing system 201, and collects information about the hardware and software subsystems implemented by the computing system 201. In some embodiments, the system monitor 320 monitors and compiles data from platform/system sensors 371, which may include, for example, temperature sensors of one or more internal components (e.g., processor digital thermal sensors (DTS), system memory thermal sensor on-die (TSOD), thermocouple, Resistance Temp Detector (RTD), thermistors, bipolar junction transistor (BJT), etc.), touch sensors, accelerometers, gyroscopes, altimeters, moisture sensors, humidity sensors, light sensors; ambient light sensors, pressure sensors, signal related sensors (e.g., infrared (IR), laser, etc.), User Presence Detection (UPD) devices, platform power sensors, pressure sensors, magnetometers, proximity sensors (e.g., IR-based), biometric sensors, and/or the like.

The system monitor 320 may also monitor and compile information about installed hardware devices embedded or attached to the computing system 201, drivers, applications, system settings, system software programs, software agents and/or AI agents, kernel extensions/modules, etc. implemented by the computing system 201. The compiled information indicates current state information including, for example, system status; processor usage or utilization; processor frequency; processor temperature; currently running processes or tasks; memory usage, utilization, and/or available memory space; memory Self-Monitoring Analysis and Reporting Technology (SMART) indicators; system uptime; network addresses (e.g., IP addresses or the like); network connections; battery charge; battery level threshold; fuel levels; system name or identifier(s); user identifier(s); user permissions; user subscription data; the date and time; and/or other like data/information such as the aforementioned compute node capabilities. The system monitor 320 compiles the system information into a suitable format (e.g., plain text, rich text format (RTF), XML, JSON, etc.), and exports the compiled information to the CP 302.

Vision sensing techniques 321 helps the computing system 201 extract useful information from one or more images, or a sequence of images. The one or more imaging sensors 373 may be the same or similar to the sensors 872 of FIG. 8. In addition to using image data of one or more imaging sensors 373, vision sensing techniques 321 may include vision sensing models that can be built using, for example, image/object recognition (or object classification), object tracking, semantic and/or instance segmentation, image reconstruction techniques, and/or the like.

ULP 322 (or Natural Language Processing (NLP)) may also be used to determine the context of the computing system 201. ULP 322 applies algorithms or models to human language, as captured by the audio sensor(s) 375, to identify the context of the computing system 201 based on its surroundings. The one or more audio sensors 375 may include microphones and/or may be the same or similar to the sensors 872 of FIG. 8. In these embodiments, the ULP 322 may indicate the setting, situation, background, or environment in which the computing system 201 or user is located such as, for example, when the user is in a work environment versus a home environment. Example models used for ULP 322 include lemmatization and stemming, word segmentation, morphological segmentation, named—entity recognition, word clouds, among many others including those discussed herein.

As mentioned previously, the SLP 305 for a target location is determined from the PLP 301 and the CP 302. The SLP 305 is based on "semantic locations," which are locations that are not solely determined or represented by geographic coordinates or geolocation, but rather by the state of the computing system 201 and other contextual factors (e.g., as determined by the CP 302). Some examples of semantic locations may include "secure location" versus "unsecure location", "congested" or "high traffic area", "music auditorium," "in-vehicle," whether the computing system 201 is at home, at an office, on a flight, in a foreign country, etc. These example semantic locations are not associated with specific geolocations, but rather to the detection of the computing system 201 moving away from or towards a geolocation associated with a place or area. These semantic locations, in addition to the predicted physical location, are fed as inputs to higher layers (e.g., the RLRM 210, NDS 220, and policy manager 205 of FIG. 2).

Figure 4:
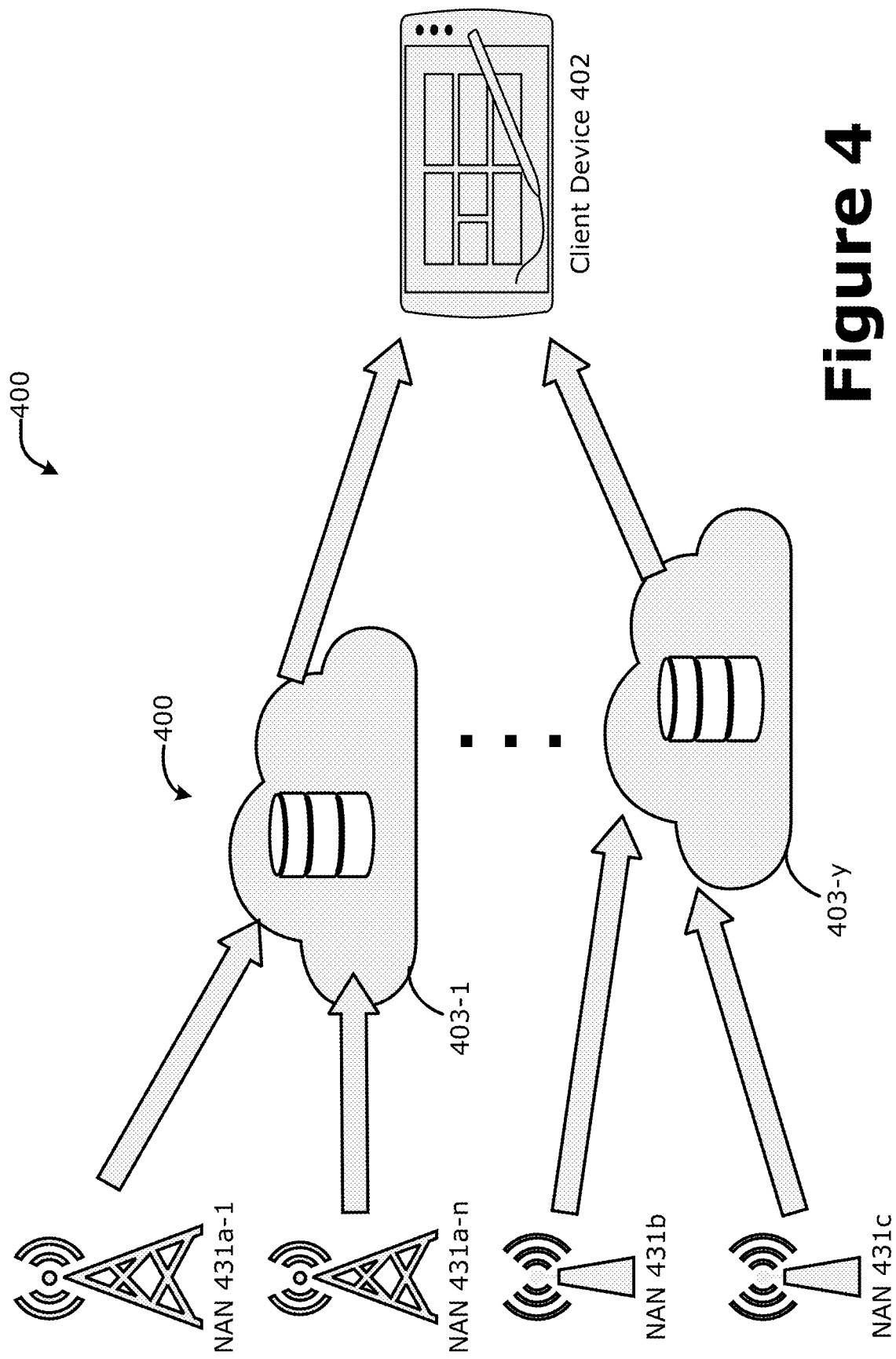
FIG. 4 illustrates an example distributed model with multiple repositories containing information about available networks according to various embodiments.

FIG. 4 illustrates an example network repository system 400 according to various embodiments. The system 400 implements a distributed model with multiple repositories 403-1 to 403-$y$ (where y is a number) that store network information. NANs 431$a$, 431$b$, and 431$c$ may be the same or similar to NANs 131$a$, 131$b$, and 131$c$, respectively, and/or any other network access node discussed herein, and the client device 402 may be the same or similar as the computing system 201 of FIG. 2, and/or the UEs 111, 121.

Each of the repositories 403-1 to 403-$y$ (collectively referred to as "repositories 403" or "repository 403") is a store or database (or collection of stores/databases) of network-related data with data management, search, and access technologies that allow the client device 402 (or the network discovery service 220 implemented by the client device 402) to obtain network information for context aware HO. The repositories 403 contain (store) information (e.g., metadata and the like) about available networks, their implemented RATs, and the collection of NANs 431 making up each network. In embodiments, each repository 403 holds metadata, semantics, network connectivity or availability data, network QoS parameters, signal strength and/or quality measurements, physical locations of individual NANs 431, RAT types implemented by individual NANs 431, coverage areas of individual NANs 431, service areas provided by individual network operators/wireless carriers in certain geographic areas, and/or other information related to networks/RATs in different regions/areas.

In some embodiments, the repositories 403 may be implemented by a central cloud computing service (e.g., cloud 144 of FIG. 1). In other embodiments, the repositories 403 may be implemented by an edge computing network and/or a suitable CDN, where edge compute nodes and associated storage resources are deployed at or near the network's edge, such as being co-located with respective NANs 431. In these embodiments, the previously discussed edge cloud computing service (e.g., see e.g., edge nodes 130 of FIG. 1). In some embodiments, the repositories 403 may be implemented by a cellular core network function or application function. In some embodiments, the repositories 403 may be implemented by an enterprise or other private network. For example, the physical location of individual WLAN APs 431c belonging to an enterprise within one or more office buildings or enterprise campuses can be stored in one or more of the secure enterprise repositories 403 within the enterprise premises itself or tenant/cloud storage space owned or rented by the enterprise. In some embodiments, a hybrid approach including both central cloud services and edge networking technologies may be used such as, for example, the previously discussed fog implementation. In another example, the hybrid approach could include a cloud service hosting one or more secure repositories 403 for an enterprise as discussed previously, and hosting one or more public repositories 403 including network related information for publically accessible NANs 431a-c. Other implementations are possible in other embodiments.

The client device 402 (or the network discovery service 220 implemented by the client device 402) can query one or more repositories 403 to obtain network information for one or more available networks in a given area (e.g., geographic region, or the like). The NANs 431a-1 to 431a-n (where n is a number), 431b, and 431c (collectively referred to as "NANs" 431" or the like) can also periodically or asynchronously send updated network information to one or more repositories 403 to ensure that the repositories 403 include the most up-to-date information as is possible. A split model can be employed where the client device 402 can query more than one repository 403 to obtain network information for one or more available networks in or around a predicted target location. Various information security (InfoSec) measures may be used to adequately protect this information, for example, by only providing the network information to client devices 402 only after they are sufficiently authenticated by the available networks and/or by an operator that owns/controls the network repository system 400.

Figure 5:
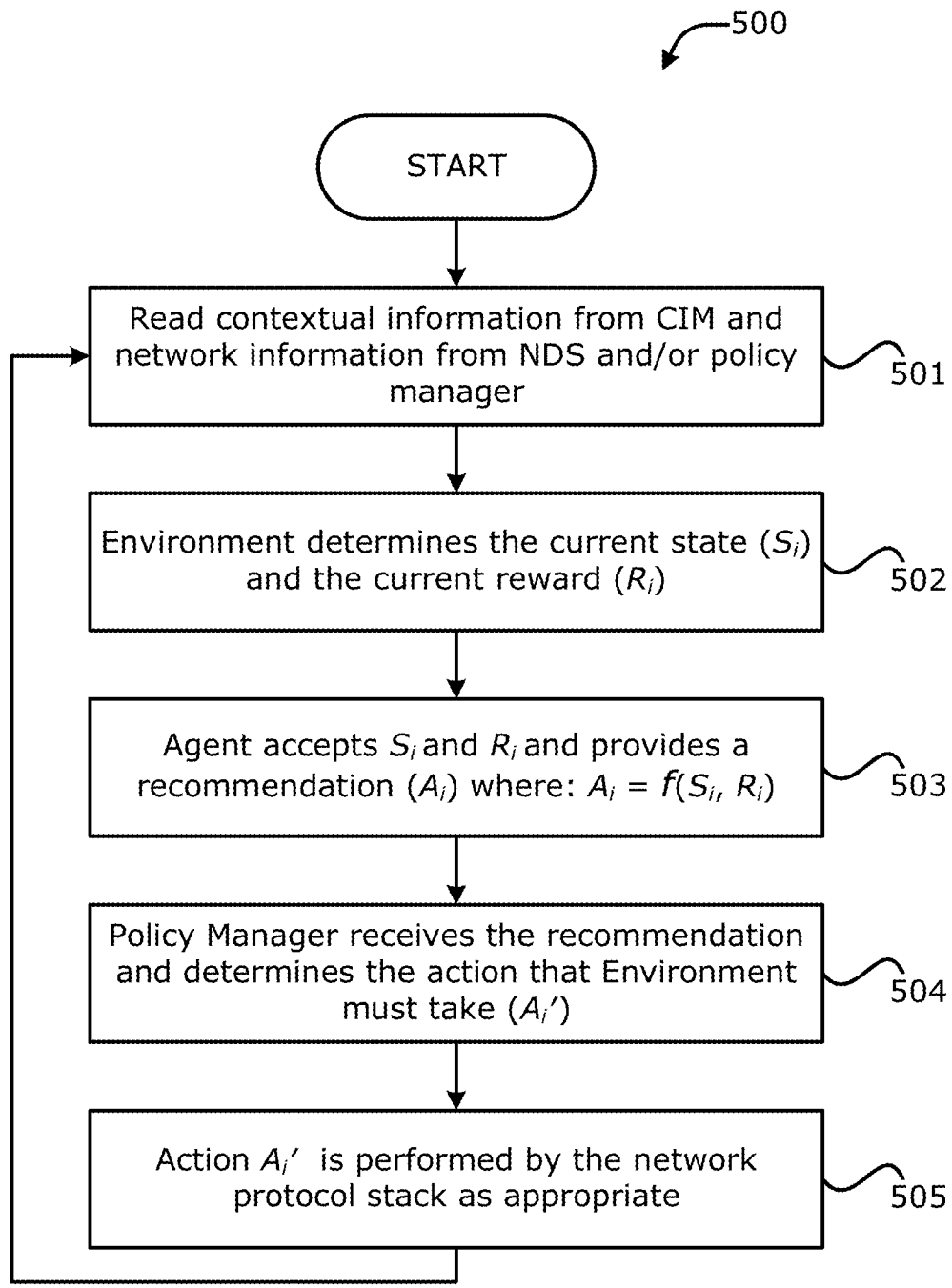
FIG. 5 illustrates an example reinforcement learning based algorithm for network recommendation according to various embodiments.

FIG. 5 illustrates an example Reinforced Learning Recommendation Model (RLRM) algorithm 500 for network recommendations according to various embodiments. The RLRM algorithm 500 (or simply "RLRM 500") may correspond to the RLRM 210 of FIG. 2. The RLRM 500 (also referred to as a "network recommendation model," "RL model," or the like) provides recommendations on network types, RAT types, NAN 431 types, and/or combination(s) thereof, that a client device 402 should connect to that will have a best or optimal network connectivity and/or best QoS among available networks, RATs, NANs 431, and/or combination(s) thereof. The RLRM 500 can characterize systems/networks at a given point in time and a given location to provide recommendations tailored to a user's behavior, and client device 402 contexts, network usage, and/or other like parameters. Using RL allows client devices 402 to perform inter-RAT and intra-RAT HOs more efficiently (e.g., with less delay or latency) than existing inter-RAT and intra-RAT HO techniques.

For purposes of the present disclosure, the Environment may include an entire compute node (e.g., client device 402), including the hardware platform, system software, network information, the CIM (see e.g., CIM 230 of FIG. 2), applications, and/or other like data and/or components of the compute node. The Agent in RLRM 500 is an object/element that provides recommendations on the networks, RATs, and/or NANs 431 to use or access.

The RLRM 500 begins at operation 501, where the Agent reads contextual information from the CIM 230 and network related information from the NDS 220 and/or the Policy Manager 205 as discussed previously. At operation 502, the Environment determines a current State ($S_i$) and a current Reward ($R_i$).

The current State ($S_i$) can be in the form of direct readings of sensor 272 (see e.g., FIG. 2), or the current State ($S_i$) can be more high-level and abstract data, such as context information and/or semantic locations. In embodiments, the current State ($S_i$) of the Environment is determined by reading inputs from the CIM 230. In these embodiments, the RLRM 500 determines various sub-states by processing the inputs from the modules in the CIM 230 (e.g., PLP 301, CP 302, and SLP 305 of FIG. 3). Examples of these sub-states may include:

I. Is the compute node within a geofence that surrounds an area with good network availability and/or network reliability (e.g., at or above some threshold availability or reliability metric)?

II. Is the compute node within a service area or coverage area with good network availability and/or network reliability e.g., at or above some threshold availability or reliability metric)?

III. Does any input from the NLP module (e.g., ULP sensing 322 of FIG. 3) indicate that the compute node is in a public place (e.g., an airport, shopping mall, or the like), which may not have a secure network connection?

IV. Does the Semantic Location of the compute node indicate that the compute node (e.g., as determined by the SLP 305 of FIG. 3) is in a well-known location (e.g., a user's home or office) that offers a stable network connection?

V. Does the compute node's movements indicate that the user will be traversing great distances and could potentially benefit from connecting to a suitable cellular network?

The sub-states are weighted against the priority of the CIM 230 providing the contextual information. Based on these sub-states, the RLRM 500 establishes the overall State of the Environment. For example, a sub-state corresponding to geofencing data may have a high priority since the data is often reliable and provides a good indication of the network QoS for a given area.

In RL, a reward signal defines a goal in an RL problem. At each time step, the environment sends to the Agent a single number called the reward. The Agent's sole objective is to maximize the total reward it receives. Therefore, the reward signal defines good and bad events for the Agent. Additionally, the reward signal is the basis for altering the policy. If an action selected by the policy manager 205 is followed by a low reward, then the policy may be changed to select some other action in that situation in the future. In general, reward signals may be stochastic functions of the state of the environment and the actions taken.

The current Reward ($R_i$) is an immediate reward provided to the Agent after a transition to the current state from a previous state, which is usually provided to the Agent after performing a particular task or action. The current Reward ($R_i$) also refers to the positive or negative reinforcement provided to the Agent. In various embodiments, the current Reward ($R_i$) is determined based on the feedback 207 provided by the Policy Manager 205. In some embodiments, the Reward ($R_i$) is initially zero, and subsequent Rewards ($R_i$) are based on the feedback 207 obtained after performing an action (e.g., recommending a target or set of candidate targets). In general, there are two types of Rewards ($R_i$): positive rewards and negative rewards (or penalties).

Positive rewards are used for positive reinforcement. Positive rewards are provided when an action leads to a state that advances a goal, or for transitions to/from a goal state. In some implementations, positive rewards are positive values (e.g., +1). When an event occurs due to a desired behavior, a Reward ($R_i$) that increases the strength and/or the frequency of the behavior is provided to the Agent. In embodiments, positive feedback (reward) 207 indicates that the Agent provided a recommendation that resulted in good QoS, positive user experience, and/or some other positive network related event, and the subsequent Reward ($R_i$) will be positive. The better the feedback 207 received, the more positive the subsequent Reward ($R_i$).

Negative rewards are used for negative reinforcement. Negative reinforcement strengthens a desired behavior by stopping or avoiding a negative condition or undesired behavior. Negative rewards are provided when an action leads to a state that does not advance a goal, or for transitions to/from non-goal states. In some implementations, negative rewards are negative values (e.g., −1). In embodiments, negative feedback (reward) 207 indicates that the Agent provided a recommendation that resulted in poor QoS, negative or unsatisfactory user experience, and/or the like, and the subsequent Reward ($R_i$) will be negative. The Rewards ($R_i$) may also be scaled or weighted, such that the worse (more negative) the feedback 207 is, the subsequent Reward ($R_i$) will be more negative. Similarly, the better (more positive) the feedback 207 is, the subsequent Reward ($R_i$) will be more positive.

At operation 503, the Agent accepts the observation (e.g., $S_i$ and $R_i$), and provides a recommendation to higher layers. Here, the recommendation may refer to a current Action ($A_i$) provided by the Agent based on the current State of the Environment ($S_i$) and the current Reward ($R_i$), where $A_i$=f($S_i,R_i$). Here, f( ) may be a value function that estimates a value of the current state and the current reward given a particular action. The value of a state is the total amount of reward the Agent can expect to accumulate over time starting from that state.

In embodiments, the Agent interacts with the Environment in discrete time steps or time instances t. It should be noted that the time steps or time instances t may refer to fixed intervals of real time (e.g., in seconds, milliseconds, or the like), or the time steps or time instances t can refer to arbitrary successive stages of decision making and acting. At each time instance t, the Agent receives an observation from the Environment (e.g., contextual information, semantic location, etc.). Here, the observation may include the current State ($S_i$) and the current Reward ($R_i$). Then, the Agent chooses an Action ($A_i$) from a set of available actions, which is subsequently sent to the Environment (e.g., the Policy Manager 204 at operation 504). The Environment moves to a new state and the reward associated with the transition is determined. The Agent attempts to collect as much positive reward as possible and minimize the amount of negative reward that is collected.

In various embodiments, the chosen Action ($A_i$) is in the form of a recommended target or set of candidate targets. As mentioned previously, the target or set of candidates may include one or more of a type of network, a RAT type (e.g., WLAN/WiFi, WWAN/WiMAX, LTE, NR, a low power or personal area network (PAN), etc.), a specific carrier or network operator, a specific NAN to camp on, and/or other like target parameters. When the chosen Action ($A_i$) is in the form of a set of candidate networks, RATs, or NANs, where the policy manager 204 selects a target network, RAT, or NAN from among the set of candidates. In various embodiments, the Agent attempts to maximize the Reward ($R_i$) and suggest an Action that will yield higher (e.g., more positive) Rewards ($R_i$), which in turn ensures a more optimal QoS and/or improved user experience. An advantage of using the RLRM 500 is that the Reward ($R_i$) helps tailor the Agent's recommendations to suit the user's behavior and preferences, and/or suit the capabilities and/or operational constraints of the compute node.

At operation 504, the Policy Manager 204 receives the recommendation (e.g., the chosen Action ($A_i$)) and determines an Action ($A_i'$) that the Environment should take. In embodiments, the Policy Manager 204 may implement a policy or strategy that defines criteria for deciding the next action based on the current state. The policy may define different actions to be performed in different states to gain a maximum reward in the future. The policy may be deterministic (e.g., where each state is mapped to a particular action) or stochastic (e.g., where each action has a certain probability that is determined from the current state). At operation 505, the action ($A_i'$) is performed by the Environment according to a protocol stack of the selected network, as appropriate. After or during operation 504 or 505, the Policy Manager 204 provides feedback 207, which may be a positive or negative reward.

A first example involves includes initialization of the RLRM 500. In this example, the inputs from the other components (see e.g., FIG. 2) indicating that the compute node is in a geofence or specific service/coverage area (e.g., the user's home) (501). Additionally, the initial Reward ($R_0$) is zero and the initial State ($S_0$) indicates that the compute node is within a geofence or service/coverage area where the network connectivity for a particular network/RAT type is relatively strong (502). Based on this information, the Agent provides an Action ($A_i$) (503), which recommends that the compute node connects to this network/RAT type (e.g., the WiFi network in the user's home).

A second example involves positive reinforcement of the RLRM 500. In this example, the Agent receives a current State ($S_i$) (502), which indicates that the compute node is outdoors and/or is travelling at a high speed, and a current Reward ($R_i$) is positive with a high value. In this example, the Agent can determine that the compute node is possibly in an area without a particular type of network connectivity (e.g., WiFi networks may be unavailable). Based on this information, the Agent provides an Action ($A_i$) (503), which recommends connecting to a cellular network (e.g., 5G/NR).

A third example involves negative reinforcement of the RLRM 500. In this example, the inputs from the SLP 305 and/or CP 302 (or ULP/NLP 322) (see e.g., FIG. 3) indicating that the compute node is at a shopping mall (501), and receives a current State ($S_i$) (502), which indicates that the compute node is at a public place, but a low confidence value is associated with the current State ($S_i$) or the inputs obtained from the SLP 305 and/or CP 302 (or ULP/NLP 322). Further, the current Reward ($R_i$) is less negative (502). Based on the inputs from the SLP 305 and/or CP 302 (or ULP/NLP 322), the Agent determines that if the compute node is in a specific type of public place (e.g., a shopping mall), then there is likely an available network connection of a specific type (e.g., WiFi). However, since the inputs have a relatively low confidence, and the current Reward ($R_i$) is negative, the Agent may recommend connecting to a different type of network or RAT (e.g., a 5G cellular network) (503).

Although the present disclosure provides an example of RLRM 500, it should be understood that other RL algorithms may be used in other embodiments based on system implementation including, for example, aspects of the system's design, how the Environment is characterized, and/or performance of the algorithms, and the like. Examples of other RL algorithms that may be used include MDP, Monte Carlo methods, temporal difference learning, Q-leaning, Deep Q Networks (DQN), State-Action-Reward-State-Action (SARSA), a distributed cluster-based multi-agent bidding solution (DCMAB), and the like.

Figure 6:
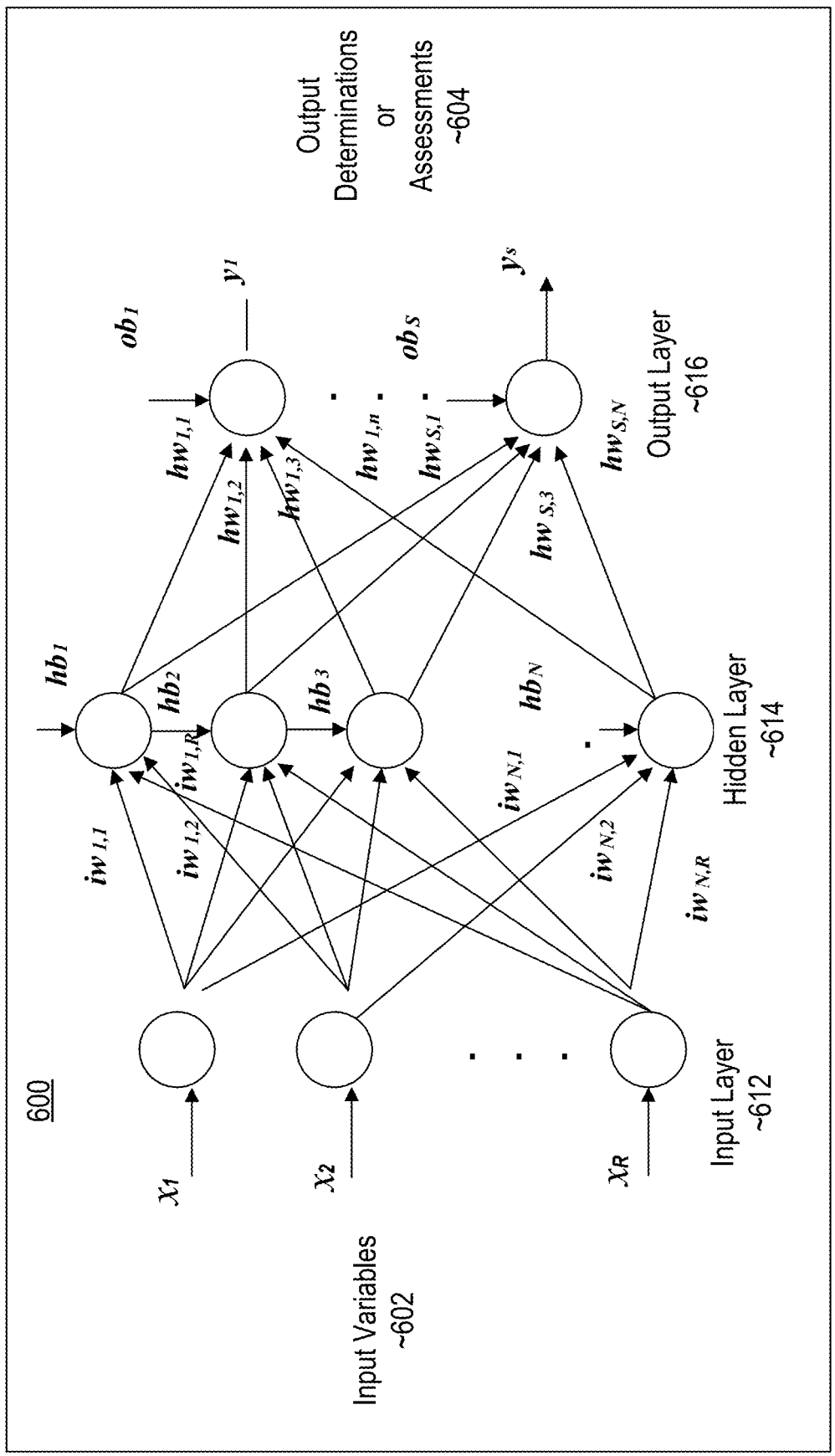
FIG. 6 illustrates an example NN suitable for practicing the various embodiments herein.

FIG. 6 illustrates an example neural network (NN) 600 in accordance with various embodiments. NN 600 may be suitable for use by one or more of the subsystems and/or the various embodiments discussed herein, implemented in part by a hardware accelerator or processor circuitry. The example NN 600 is a multi-layer feedforward NN (FNN) comprising an input layer 612, one or more hidden layers 614, and an output layer 616. Input layer 612 receives data of input variables (z) 602. Hidden layer(s) 614 processes the inputs, and eventually, output layer 616 outputs the determinations or assessments ($y_i$) 604. In one example implementation the input variables ($x_i$) 602 of the NN are set as a vector containing the relevant variable data, while the output determination or assessment ($y_i$) 604 of the NN 600 are also as a vector. As an example, the multi-layer FNN may be expressed through the following equations:

$$ho_i = f(\Sigma_{j=1}^{R}(iw_{i,j}x_j) + hb_i), \text{ for } i=1,\ldots,N$$

$$y_i = f(\Sigma_{k=1}^{N}(hw_{i,k}ho_k) + ob_i), \text{ for } i=1,\ldots,S$$

where $ho_i$ and $y_i$ are the hidden layer variables and the final outputs, respectively. f( ) is typically a non-linear function, such as the sigmoid function or rectified linear (ReLu) function that mimics the neurons of the human brain. R is the number of inputs. N is the size of the hidden layer, or the number of neurons. S is the number of the outputs.

The goal of the FNN is to minimize an error function E between the network outputs and the desired targets, by adapting the network variables iw, hw, hb, and ob, via training, as follows:

$$E = \Sigma_{k=1}^{m}(E_k), \text{ where } E_k = \Sigma_{p=1}^{S}(t_{kp} - y_{kp})^2$$

where $y_{kp}$ and $t_{kp}$ are the predicted and the target values of pth output unit for sample k, respectively, and m is the number of samples.

In one example, input variables (xi) 602 may include various sensor data collected by various sensors, as well as data describing relevant factors to a decision. The output variables (yi) 604 may include determined response. The network variables of the hidden layer(s) for the NN 600, are determined by the training data.

In another example, the NN 600 is used for the motion detection 312 of FIG. 3, which is used to determine the motion/activity of the computing system 201 for the motion/activity detection 312 based on the motion/activity sensor data obtained from the one or more activity/motion sensors 372.

In another example, the NN 600 is used for object detection/classification of the vision sensing 321 of FIG. 3. The object detection or recognition models may include an enrollment phase and an evaluation phase. During the enrollment phase, one or more features are extracted from image or video data. A feature is an individual measureable property or characteristic. In the context of object detection, an object feature may include an object size, color, shape, relationship to other objects, and/or any region or portion of an image, such as edges, ridges, corners, blobs, and/or some defined regions of interest (ROI), and/or the like. The features used may be implementation specific, and may be based on, for example, the objects to be detected and the model(s) to be developed and/or used. The evaluation phase involves identifying or classifying objects by comparing obtained image data with existing object models created during the enrollment phase. During the evaluation phase, features extracted from the image data are compared to the object identification models using a suitable pattern recognition technique. The object models may be qualitative or functional descriptions, geometric surface information, and/or abstract feature vectors, and may be stored in a suitable database that is organized using some type of indexing scheme to facilitate elimination of unlikely object candidates from consideration.

In another example, the NN 600 is used for object tracking of the vision sensing 321 of FIG. 3. The object tracking and/or computer vision techniques may include, for example, edge detection, corner detection, blob detection, a Kalman filter, Gaussian Mixture Model, Particle filter, Mean-shift based kernel tracking, an ML object detection technique (e.g., Viola-Jones object detection framework, scale-invariant feature transform (SIFT), histogram of oriented gradients (HOG), etc.), a deep learning object detection technique (e.g., fully convolutional neural network (FCNN), region proposal convolution neural network (R-CNN), single shot multibox detector, 'you only look once' (YOLO) algorithm, etc.), and/or the like.

In another example, the NN 600 is used for NLP/ULP 322, where models may be trained on context-reply pairs. The context in a context-reply pair is one or more sentences that precede a reply or context of that context-reply pair, and the reply or context may also include one or more sentences. Each sentence comprises a sequence of tokens constructed based on or context lexicon, vocabulary, and/or grammar rules. Based on the internal representation (or set of tokens) of the inputs, the NN 600 selects appropriate replies or the appropriate context as the output determination or assessment ($y_i$). In another example, the NLP/ULP 322 models may be trained on entities and intents, where the entities are mappings of natural language word combinations to standard phrases conveying their unobscured meaning, and intents are mappings of the unobscured meanings to corresponding contexts. Actions may also be mapped to corresponding intents, which may be in the form of text recommendations (e.g., of network, RAT, and/or NAN type) or executable functions, which may take optional parameters or contextual information.

In the example of FIG. 6, for simplicity of illustration, there is only one hidden layer in the NN. In some other embodiments, there can be many hidden layers. Furthermore, the NN 600 can be another type of topology, such as Convolution NN (CNN), Recurrent NN (RNN), a Long Short Term Memory (LSTM) algorithm, a deep CNN (DCN), a Deconvolutional NN (DNN), a gated recurrent unit (GRU), a deep belief NN, a deep FNN (DFF), a deep stacking network, a Markov chain, a hidden Markov model (HMM), a perception NN, a Bayesian Network (BN), a Dynamic BN (DBN), a Linear Dynamical Systems (LDS), a Switching LDS (SLDS), and so forth.

Implementation of the preceding techniques may be accomplished through any number of specifications, configurations, or example deployments of hardware and software. It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

3. Computing System and Hardware Configurations

Figure 7:
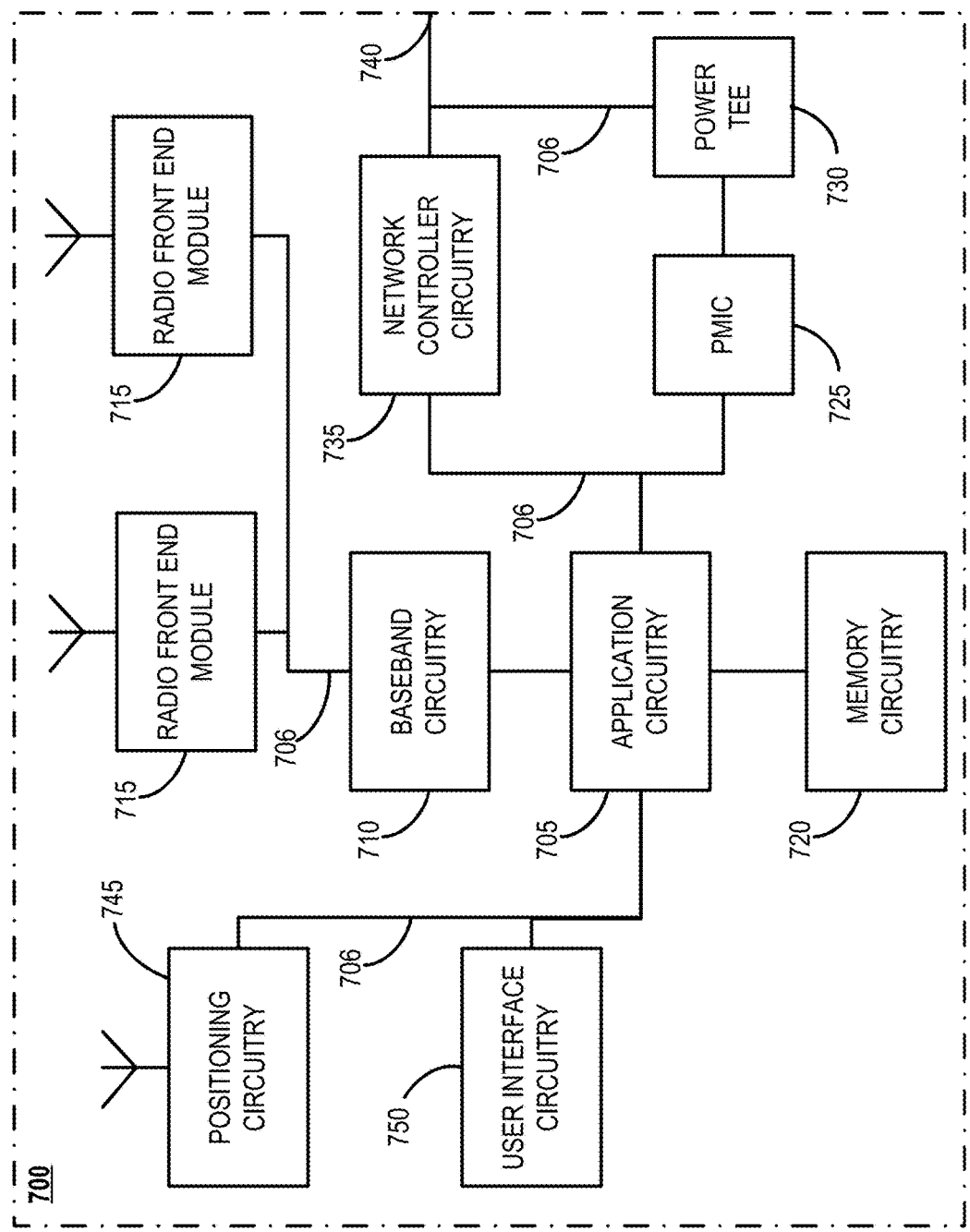
FIGS. 7 and 8 depict example components of various compute nodes in edge computing system(s).
Figure 8:
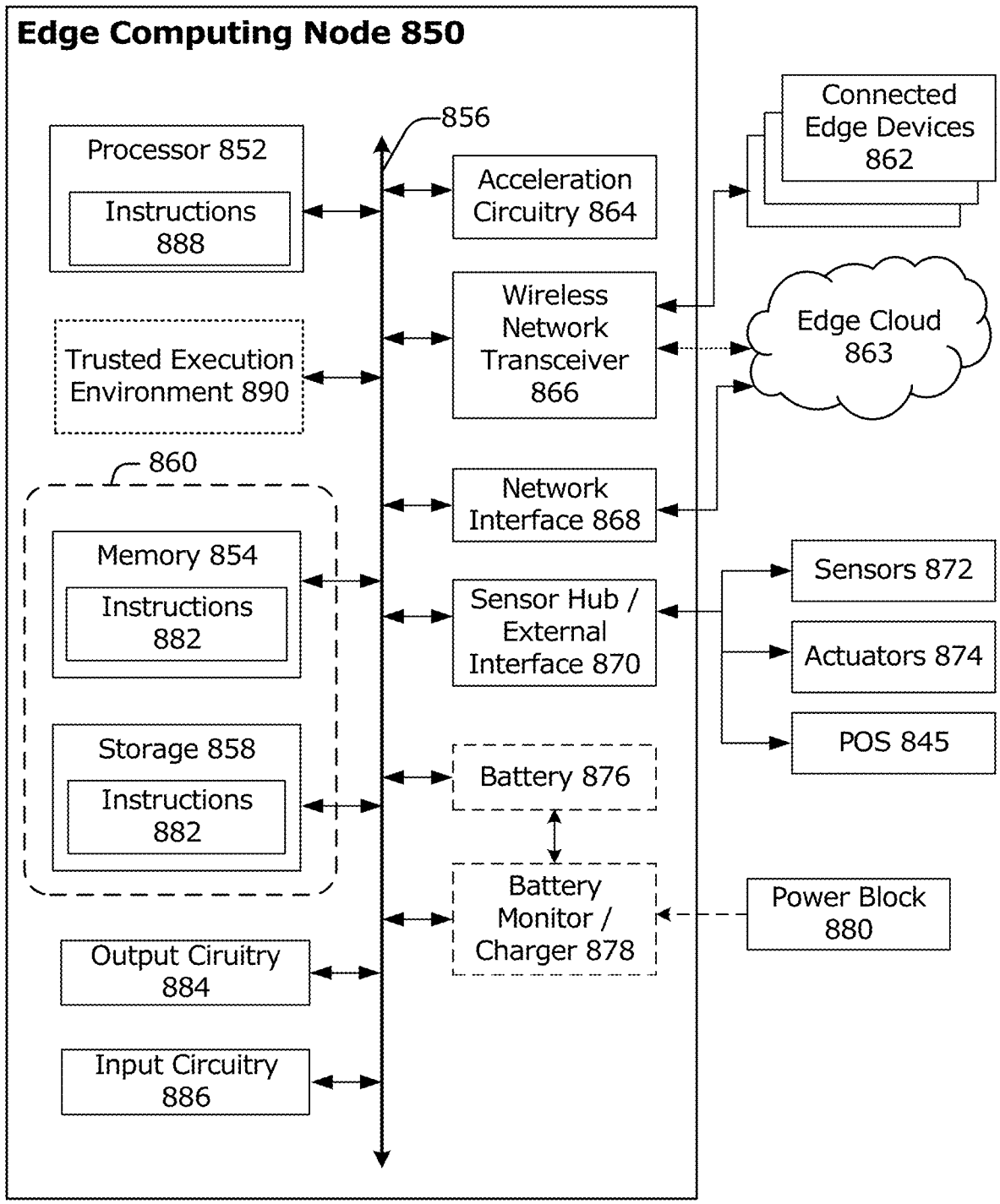

FIGS. 7 and 8 depict examples of edge computing systems and environments that may fulfill any of the compute nodes or devices discussed herein. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

FIG. 7 illustrates an example of infrastructure equipment 700 in accordance with various embodiments. The infrastructure equipment 700 (or "system 700") may be implemented as a BS, road side unit (RSU), roadside ITS-S(R-ITS-S), radio head, relay station, server, gateway, and/or any other element/device discussed herein.

The system 700 includes application circuitry 705, baseband circuitry 710, one or more radio front end modules (RFEMs) 715, memory circuitry 720, power management integrated circuitry (PMIC) 725, power tee circuitry 730, network controller circuitry 735, network interface connector 740, positioning circuitry 745, and user interface 750. In some embodiments, the device 700 may include additional elements such as, for example, memory/storage, display, camera, sensor, or 10 interface. In other embodiments, the components described below may be included in more than one device. For example, said circuitries may be separately included in more than one device for CRAN, CR, vBBU, or other like implementations.

Application circuitry 705 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose IO, memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 705 may be coupled with or may include memory/storage elements and may be configured to execute instructions stored in the memory/storage to enable various applications or operating systems to run on the system 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 705 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more DSPs, one or more FPGAs, one or more PLDs, one or more ASICs, one or more microprocessors or controllers, or any suitable combination thereof. In some embodiments, the application circuitry 705 may comprise, or may be, a special-purpose processor/controller to operate according to the various embodiments herein. As examples, the processor(s) of application circuitry 705 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 700 may not utilize application circuitry 705, and instead may include a special-purpose processor/controller to process IP data received from an EPC or 5GC, for example.

In some implementations, the application circuitry 705 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more field-programmable gate arrays (FPGAs); programmable logic devices (PLDs) such as complex PLDs (CPLDs), high-capacity PLDs (HCPLDs), and the like; ASICs such as structured ASICs and the like; programmable SoCs (PSoCs); and/or the like. In such implementations, the circuitry of application circuitry 705 may comprise logic blocks or logic fabric, and other interconnected resources that may be programmed to perform various functions, such as the procedures, methods, functions, etc. of the various embodiments discussed herein. In such embodiments, the circuitry of application circuitry 705 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

In some implementations, such as implementations where subsystems of the edge nodes 130, intermediate nodes 120, and/or endpoints 110 of FIG. XS1 are individual software agents or AI agents, each agent is implemented in a respective hardware accelerator that are configured with appropriate bit stream(s) or logic blocks to perform their respective functions. In these implementations, processor(s) and/or hardware accelerators of the application circuitry 705 may be specifically tailored for operating the agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating co-processor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like.

The baseband circuitry 710 may be implemented, for example, as a solder-down substrate including one or more integrated circuits, a single packaged integrated circuit soldered to a main circuit board or a multi-chip module containing two or more integrated circuits. The baseband circuitry 710 includes one or more processing devices (e.g., baseband processors) to carry out various protocol and radio control functions. Baseband circuitry 710 may interface with application circuitry of system 700 for generation and processing of baseband signals and for controlling operations of the RFEMs 715. The baseband circuitry 710 may handle various radio control functions that enable communication with one or more radio networks via the RFEMs 715. The baseband circuitry 710 may include circuitry such as, but not limited to, one or more single-core or multi-core processors (e.g., one or more baseband processors) or control logic to process baseband signals received from a receive signal path of the RFEMs 715, and to generate baseband signals to be provided to the RFEMs 715 via a transmit signal path. In various embodiments, the baseband circuitry 710 may implement a real-time OS (RTOS) to manage resources of the baseband circuitry 710, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 7, in one embodiment, the baseband circuitry 710 includes individual processing device(s) to operate one or more wireless communication protocols (e.g., a "multi-protocol baseband processor" or "protocol processing circuitry") and individual processing device(s) to implement physical layer (PHY) functions. In this embodiment, the protocol processing circuitry operates or implements various protocol layers/entities of one or more wireless communication protocols. In a first example, the protocol processing circuitry may operate LTE protocol entities and/or 5G/NR protocol entities when the RFEMs 715 are cellular radiofrequency communication system, such as millimeter wave (mmWave) communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the RFEMs 715 are WiFi communication system. In the second example, the protocol processing circuitry would operate WiFi MAC and LLC functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 710 and/or RFEMs 715. The baseband circuitry 710 may also support radio communications for more than one wireless protocol.

Continuing with the aforementioned embodiment, the baseband circuitry 710 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), pre-coding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 750 may include one or more user interfaces designed to enable user interaction with the system 700 or peripheral component interfaces designed to enable peripheral component interaction with the system 700. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 715 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 715, which incorporates both mmWave antennas and sub-mmWave. The antenna array comprises one or more antenna elements, each of which is configured convert electrical signals into radio waves to travel through the air and to convert received radio waves into electrical signals. For example, digital baseband signals provided by the baseband circuitry 710 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry using metal transmission lines or the like.

The memory circuitry 720 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 720 may be implemented as one or more of solder down packaged integrated circuits, socketed memory modules and plug-in memory cards.

The memory circuitry 720 is configured to store computational logic (or "modules") in the form of software, firmware, or hardware commands to implement the techniques described herein. The computational logic or modules may be developed using a suitable programming language or development tools, such as any programming language or development tool discussed herein. The computational logic may be employed to store working copies and/or permanent copies of programming instructions for the operation of various components of appliance infrastructure equipment 700, an operating system of infrastructure equipment 700, one or more applications, and/or for carrying out the embodiments discussed herein. The computational logic may be stored or loaded into memory circuitry 720 as instructions for execution by the processors of the application circuitry 705 to provide or perform the functions described herein. The various elements may be implemented by assembler instructions supported by processors of the application circuitry 705 or high-level languages that may be compiled into such instructions. The permanent copy of the programming instructions may be placed into persistent storage devices of memory circuitry 720 in the factory during manufacture, or in the field through, for example, a distribution medium (not shown), through a communication interface (e.g., from a distribution server), and/or over-the-air (OTA).

As discussed in more detail infra, infrastructure equipment 700 may be configured to support a particular V2X RAT based on the number of vUEs 121 that support (or are capable to communicate) the particular V2X RAT. In embodiments, the memory circuitry 720 may store a RAT configuration control module to control the (re)configuration of the infrastructure equipment 700 to support a particular RAT and/or V2X RAT. The configuration control module provides an interface for triggering (re)configuration actions. In some embodiments, the memory circuitry 720 may also store a RAT software (SW) management module to implement SW loading or provisioning procedures, and (de)activation SW in the infrastructure equipment 700. In either of these embodiments, the memory circuitry 720 may store a plurality of V2X RAT software components, each of which include program code, instructions, modules, assemblies, packages, protocol stacks, software engine(s), etc., for operating the infrastructure equipment 700 or components thereof (e.g., RFEMs 715) according to a corresponding V2X RAT. When a V2X RAT component is configured or executed by the application circuitry 705 and/or the baseband circuitry 710, the infrastructure equipment 700 operates according to the that V2X RAT component.

In a first example, a first V2X RAT component may be an C-V2X component, which includes LTE and/or C-V2X protocol stacks that allow the infrastructure equipment 700 to support C-V2X and/or provide radio time/frequency resources according to LTE and/or C-V2X standards. Such protocol stacks may include a control plane protocol stack including a Non-Access Stratum (NAS), Radio Resource Control (RRC), Packet Data Convergence Protocol (PDCP), Radio Link Control (RLC), Media Access Control (MAC), and Physical (PHY) layer entities; and a user plane protocol stack including General Packet Radio Service (GPRS) Tunneling Protocol for the user plane layer (GTP-U), User Datagram Protocol (UDP), Internet Protocol (IP), PDCP, RLC, MAC, and PHY layer entities. These control plane and user plane protocol entities are discussed in more detail in 3GPP TS 36.300 and/or 3GPP TS 38.300, as well as other 3GPP specifications. In some embodiments, the IP layer entity may be replaced with an Allocation and Retention Priority (ARP) layer entity or some other non-IP protocol layer entity. Some or all of the aforementioned protocol layer entities may be "relay" versions depending on whether the infrastructure equipment 700 is acting as a relay. In some embodiments, the user plane protocol stack may be the PC5 user plane (PC5-U) protocol stack discussed in 3GPP TS 23.303 v15.1.0 (2018-06).

In a second example, a second V2X RAT component may be a ITS-G5 component, which includes ITS-G5 (IEEE 802.11p) and/or Wireless Access in Vehicular Environments (WAVE) (IEEE 1609.4) protocol stacks, among others, that allow the infrastructure equipment to support ITS-G5 communications and/or provide radio time-frequency resources according to ITS-G5 and/or other WiFi standards. The ITS-G5 and WAVE protocol stacks include, inter alia, a DSRC/WAVE PHY and MAC layer entities that are based on the IEEE 802.11p protocol. The DSRC/WAVE PHY layer is responsible for obtaining data for transmitting over ITS-G5 channels from higher layers, as well as receiving raw data over the ITS-G5 channels and providing data to upper layers. The MAC layer organizes the data packets into network frames. The MAC layer may be split into a lower DSRC/WAVE MAC layer based on IEEE 802.11p and an upper WAVE MAC layer (or a WAVE multi-channel layer) based on IEEE 1609.4. IEEE 1609 builds on IEEE 802.11p and defines one or more of the other higher layers. The ITS-G5 component may also include a logical link control (LLC) layer entity to perform layer 3 (L3) multiplexing and demultiplexing operations. The LLC layer (e.g., IEEE 802.2) allows multiple network L3 protocols to communicate over the same physical link by allowing the L3 protocols to be specified in LLC fields.

In addition to the V2X RAT components, the memory circuitry 720 may also store a RAT translation component, which is a software engine, API, library, object(s), engine(s), or other functional unit for providing translation services to vUEs 121 that are equipped with different V2X capabilities. For example, the RAT translation component, when configured or executed, may cause the infrastructure equipment 700 to convert or translate a first message obtained according to the first V2X RAT (e.g., C-V2X) into a second message for transmission using a second V2X RAT (e.g., ITS-G5). In one example, the RAT translation component may perform the translation or conversion by extracting data from one or more fields of the first message and inserting the extracted data into corresponding fields of the second message. Other translation/conversion methods may also be used in other embodiments. In some embodiments, the RAT translation component may employ a suitable translator for translating one or more source messages in a source format into one or more target messages in a target format, and may utilize any suitable compilation strategies for the translation. The translator may also have different implementations depending on the type of V2X RATs that are supported by the infrastructure equipment 700 (e.g., memory map, instruction set, programming model, etc.).

The PMIC 725 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 730 may provide for electrical power drawn from a network cable to provide both power supply and data connectivity to the infrastructure equipment 700 using a single cable.

The network controller circuitry 735 provides connectivity to a network using a standard network interface protocol such as Ethernet, Ethernet over GRE Tunnels, Ethernet over Multiprotocol Label Switching (MPLS), or some other suitable protocol, such as those discussed herein. Network connectivity may be provided to/from the infrastructure equipment 700 via network interface connector 740 using a physical connection, which may be electrical (commonly referred to as a "copper interconnect"), optical, or wireless. The network controller circuitry 735 may include one or more dedicated processors and/or FPGAs to communicate using one or more of the aforementioned protocols. In some implementations, the network controller circuitry 735 may include multiple controllers to provide connectivity to other networks using the same or different protocols. In various embodiments, the network controller circuitry 735 enables communication with associated equipment and/or with a backend system (e.g., server(s), core network, cloud service, etc.), which may take place via a suitable gateway device.

The positioning circuitry 745 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 745 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 745 may include a Micro-Technology for Positioning, Navigation, and Timing (Micro-PNT) IC that uses a master timing clock to perform position tracking/estimation without GNSS assistance. The positioning circuitry 745 may also be part of, or interact with, the baseband circuitry 710 and/or RFEMs 715 to communicate with the nodes and components of the positioning network. The positioning circuitry 745 may also provide position data and/or time data to the application circuitry 705, which may use the data to synchronize operations with various other infrastructure equipment, or the like.

The components shown by FIG. 3 may communicate with one another using interface circuitry 306 or interconnect (IX) 706, which may include any number of bus and/or interconnect (IX) technologies such as industry standard architecture (ISA), extended ISA (EISA), inter-integrated circuit (I2C), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath interconnect (QPI), Ultra Path Interconnect (UPI), Intel® Omni-Path Architecture (OPA) IX, RapidIO™ system IXs, Cache Coherent Interconnect for Accelerators (CCIA), Gen-Z Consortium IXs, Open Coherent Accelerator Processor Interface (OpenCAPI) IX, a HyperTransport interconnect, and/or any number of other IX technologies. The IX technology may be a proprietary bus, for example, used in an SoC based system.

FIG. 8 illustrates an example of components that may be present in an edge computing node 850 for implementing the techniques (e.g., operations, processes, methods, and methodologies) described herein. This edge computing node 850 provides a closer view of the respective components of node 800 when implemented as or as part of a computing device (e.g., as a mobile device, a BS, server, gateway, etc.). The edge computing node 850 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge computing node 850, or as components otherwise incorporated within a chassis of a larger system.

The edge computing node 850 includes processing circuitry in the form of one or more processors 852. The processor circuitry 852 includes circuitry such as, but not limited to one or more processor cores and one or more of cache memory, low drop-out voltage regulators (LDOs), interrupt controllers, serial interfaces such as SPI, I²C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 852 may include one or more hardware accelerators (e.g., same or similar to acceleration circuitry 864), which may be microprocessors, programmable processing devices (e.g., FPGA, ASIC, etc.), or the like. The one or more accelerators may include, for example, computer vision and/or deep learning accelerators. In some implementations, the processor circuitry 852 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 852 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 852 may be coupled with or may include memory/storage and may be configured to execute instructions stored in the memory/storage to enable various applications or operating systems to run on the node 850. The processors (or cores) 852 is configured to operate application software to provide a specific service to a user of the node 850. In some embodiments, the processor(s) 852 may be a special-purpose processor(s)/controller(s) configured (or configurable) to operate according to the various embodiments herein.

As examples, the processor(s) 852 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centriq™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 852 may be a part of a system on a chip (SoC), System-in-Package (SiP), a multi-chip package (MCP), and/or the like, in which the processor(s) 852 and other components are formed into a single integrated circuit, or a single package, such as the Edison™ or Galileo™ SoC boards from Intel® Corporation. Other examples of the processor(s) 852 are mentioned elsewhere in the present disclosure.

The processor(s) 852 may communicate with system memory 854 over an interconnect (IX) 856. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 858 may also couple to the processor 852 via the IX 856. In an example, the storage 858 may be implemented via a solid-state disk drive (SSDD) and/or high-speed electrically erasable memory (commonly referred to as "flash memory"). Other devices that may be used for the storage 858 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 854 and/or storage circuitry 858 may also incorporate three-dimensional (3D) cross-point (XPOINT) memories from Intel® and Micron®.

In low power implementations, the storage 858 may be on-die memory or registers associated with the processor 852. However, in some examples, the storage 758 may be implemented using a micro hard disk drive (HDD). Further, any number of new technologies may be used for the storage 858 in addition to, or instead of, the technologies described, such resistance change memories, phase change memories, holographic memories, or chemical memories, among others.

The storage circuitry 858 store computational logic 882 (or "modules 882") in the form of software, firmware, or hardware commands to implement the techniques described herein. The computational logic 882 may be employed to store working copies and/or permanent copies of computer programs, or data to create the computer programs, for the operation of various components of node 850 (e.g., drivers, etc.), an OS of node 850 and/or one or more applications for carrying out the embodiments discussed herein. The computational logic 882 may be stored or loaded into memory circuitry 854 as instructions 882, or data to create the instructions 888, for execution by the processor circuitry 852 to provide the functions described herein. The various elements may be implemented by assembler instructions supported by processor circuitry 852 or high-level languages that may be compiled into such instructions (e.g., instructions 888, or data to create the instructions 888). The permanent copy of the programming instructions may be placed into persistent storage devices of storage circuitry 858 in the factory or in the field through, for example, a distribution medium (not shown), through a communication interface (e.g., from a distribution server (not shown)), or over-the-air (OTA).

In an example, the instructions 888 provided via the memory circuitry 854 and/or the storage circuitry 858 of FIG. 8 are embodied as one or more non-transitory computer readable storage media (see e.g., NTCRSM 860) including program code, a computer program product or data to create the computer program, with the computer program or data, to direct the processor circuitry 858 of node 850 to perform electronic operations in the node 850, and/or to perform a specific sequence or flow of actions, for example, as described with respect to the flowchart(s) and block diagram(s) of operations and functionality depicted previously. The processor circuitry 852 accesses the one or more non-transitory computer readable storage media over the interconnect 856.

In alternate embodiments, programming instructions (or data to create the instructions) may be disposed on multiple NTCRSM 860. In alternate embodiments, programming instructions (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 860 may be embodied by devices described for the storage circuitry 858 and/or memory circuitry 854. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 882, instructions 882, instructions 888 discussed previously) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 850, partly on the system 850, as a stand-alone software package, partly on the system 850 and partly on a remote computer or entirely on the remote computer or server. In the latter scenario, the remote computer may be connected to the system 850 through any type of network, including a LAN or WAN, or the connection may be made to an external computer (e.g., through the Internet using an Internet Service Provider).

In an example, the instructions 888 on the processor circuitry 852 (separately, or in combination with the instructions 882 and/or logic/modules 882 stored in computer-readable storage media) may configure execution or operation of a trusted execution environment (TEE) 890. The TEE 890 operates as a protected area accessible to the processor circuitry 852 to enable secure access to data and secure execution of instructions. In some embodiments, the TEE 890 may be a physical hardware device that is separate from other components of the system 850 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

In other embodiments, the TEE 890 may be implemented as secure enclaves, which are isolated regions of code and/or data within the processor and/or memory/storage circuitry of the system 850. Only code executed within a secure enclave may access data within the same secure enclave, and the secure enclave may only be accessible using the secure application (which may be implemented by an application processor or a tamper-resistant microcontroller). Various implementations of the TEE 850, and an accompanying secure area in the processor circuitry 852 or the memory circuitry 854 and/or storage circuitry 858 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 850 through the TEE 890 and the processor circuitry 852.

In some embodiments, the memory circuitry 854 and/or storage circuitry 858 may be divided into isolated user-space instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 854 and/or storage circuitry 858 may be divided into one or more trusted memory regions for storing applications or software modules of the TEE 890.

Although the instructions 882 are shown as code blocks included in the memory circuitry 854 and the computational logic 882 is shown as code blocks in the storage circuitry 858, it should be understood that any of the code blocks may be replaced with hardwired circuits, for example, built into an FPGA, ASIC, or some other suitable circuitry. For example, where processor circuitry 852 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 854 and/or storage circuitry 858 may store program code of an operating system (OS), which may be a general purpose OS or an OS specifically written for and tailored to the computing node 850. For example, the OS may be Unix or a Unix-like OS such as Linux e.g., provided by Red Hat Enterprise, Windows 10™ provided by Microsoft Corp.®, macOS provided by Apple Inc.®, or the like. In another example, the OS may be a mobile OS, such as Android® provided by Google Inc.®, iOS® provided by Apple Inc.®, Windows 10 Mobile® provided by Microsoft Corp.®, KaiOS provided by KaiOS Technologies Inc., or the like. In another example, the OS may be a real-time OS (RTOS), such as Apache Mynewt provided by the Apache Software Foundation®, Windows 10 For IoT® provided by Microsoft Corp.®, Micro-Controller Operating Systems ("MicroC/OS" or "μC/OS") provided by Micrium®, Inc., FreeRTOS, VxWorks® provided by Wind River Systems, Inc.®, PikeOS provided by Sysgo AGO, Android Things® provided by Google Inc.®, QNX® RTOS provided by BlackBerry Ltd., or any other suitable RTOS, such as those discussed herein.

The OS may include one or more drivers that operate to control particular devices that are embedded in the node 850, attached to the node 850, or otherwise communicatively coupled with the node 850. The drivers may include individual drivers allowing other components of the node 850 to interact or control various I/O devices that may be present within, or connected to, the node 850. For example, the drivers may include a display driver to control and allow access to a display device, a touchscreen driver to control and allow access to a touchscreen interface of the node 850, sensor drivers to obtain sensor readings of sensor circuitry 872 and control and allow access to sensor circuitry 872, actuator drivers to obtain actuator positions of the actuators 874 and/or control and allow access to the actuators 874, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from a secure execution environment, trusted execution environment, and/or management engine of the node 850 (not shown).

The components of edge computing device 850 may communicate over the IX 856. The IX 856 may include any number of technologies, including ISA, extended ISA, I²C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, and/or any number of other IX technologies. The IX 856 may be a proprietary bus, for example, used in a SoC based system.

The IX 856 couples the processor 852 to communication circuitry 866 for communications with other devices, such as a remote server (not shown) and/or the connected edge devices 862. The communication circuitry 866 is a hardware element, or collection of hardware elements, used to communicate over one or more networks (e.g., cloud 863) and/or with other devices (e.g., edge devices 862).

The transceiver 866 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 862. For example, a wireless local area network (WLAN) unit may be used to implement WiFi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 866 (or multiple transceivers) may communicate using multiple standards or radios for communications at a different range. For example, the edge computing node 850 may communicate with close devices, e.g., within about 10 meters, using a local transceiver based on BLE, or another low power radio, to save power. More distant connected edge devices 862, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 866 (e.g., a radio transceiver) may be included to communicate with devices or services in the edge cloud 863 via local or wide area network protocols. The wireless network transceiver 866 may be an LPWA transceiver that follows the IEEE 802.15.4, or IEEE 802.15.4g standards, among others. The edge computing node 863 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 866, as described herein. For example, the transceiver 866 may include a cellular transceiver that uses spread spectrum (SPA/SAS) communications for implementing high-speed communications. Further, any number of other protocols may be used, such as WiFi® networks for medium speed communications and provision of network communications. The transceiver 866 may include radios that are compatible with any number of 3GPP specifications, such as LTE and 5G/NR communication systems, discussed in further detail at the end of the present disclosure. A network interface controller (NIC) 868 may be included to provide a wired communication to nodes of the edge cloud 863 or to other devices, such as the connected edge devices 862 (e.g., operating in a mesh). The wired communication may provide an Ethernet connection or may be based on other types of networks, such as Controller Area Network (CAN), Local Interconnect Network (LIN), DeviceNet, ControlNet, Data Highway Plus (DH+), PROFIBUS, or PROFINET, among many others. An additional NIC 868 may be included to enable connecting to a second network, for example, a first NIC 868 providing communications to the cloud over Ethernet, and a second NIC 868 providing communications to other devices over another type of network.

Given the variety of types of applicable communications from the device to another component or network, applicable communications circuitry used by the device may include or be embodied by any one or more of components 864, 866, 8768, or 870. Accordingly, in various examples, applicable means for communicating (e.g., receiving, transmitting, etc.) may be embodied by such communications circuitry.

The edge computing node 850 may include or be coupled to acceleration circuitry 864, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 864 may comprise logic blocks or logic fabric and other interconnected resources that may be programmed (configured) to perform various functions, such as the procedures, methods, functions, etc. of the various embodiments discussed herein. In such implementations, the acceleration circuitry 864 may also include memory cells (e.g., EPROM, EEPROM, flash memory, static memory (e.g., SRAM, antifuses, etc.) used to store logic blocks, logic fabric, data, etc. in LUTs and the like.

The IX 856 also couples the processor 852 to a sensor hub or external interface 870 that is used to connect additional devices or subsystems. The additional/external devices may include sensors 872, actuators 874, and positioning circuitry 845.

The sensor circuitry 872 includes devices, modules, or subsystems whose purpose is to detect events or changes in its environment and send the information (sensor data) about the detected events to some other a device, module, subsystem, etc. Examples of such sensors 872 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temp sensors (e.g., thermistors); pressure sensors; barometric pressure sensors; gravimeters; altimeters; image capture devices (e.g., cameras, Bayer sensors/filters, etc., with or without image processing unit (IPU) or other like subsystem); light detection and ranging (LiDAR) sensors; proximity sensors (e.g., infrared radiation detector and the like); depth sensors, ambient light sensors; optical light sensors; ultrasonic transceivers; microphones; and the like.

The actuators 874, allow node 850 to change its state, position, and/or orientation, or move or control a mechanism or system. The actuators 874 comprise electrical and/or mechanical devices for moving or controlling a mechanism or system, and converts energy (e.g., electric current or moving air and/or liquid) into some kind of motion. The actuators 874 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 874 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The node 850 may be configured to operate one or more actuators 874 based on one or more captured events and/or instructions or control signals received from a service provider and/or various client systems The positioning circuitry 845 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 845 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 845 may include a Micro-Technology for Positioning, Navigation, and Timing (Micro-PNT) IC that uses a master timing clock to perform position tracking/estimation without GNSS assistance. The positioning circuitry 845 may also be part of, or interact with, the communication circuitry 866 to communicate with the nodes and components of the positioning network. The positioning circuitry 845 may also provide position data and/or time data to the application circuitry, which may use the data to synchronize operations with various infrastructure (e.g., radio BSs), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 845 is, or includes an INS, which is a system or device that uses sensor circuitry 872 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the node 850 without the need for external references.

In some optional examples, various input/output (I/O) devices may be present within or connected to, the edge computing node 850, which are referred to as input circuitry 886 and output circuitry 884 in FIG. 8. The input circuitry 8786 and output circuitry 884 include one or more user interfaces designed to enable user interaction with the node 850 and/or peripheral component interfaces designed to enable peripheral component interaction with the node 850. Input circuitry 886 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 884 may be included to show information or otherwise convey information, such as sensor readings, actuator position(s), or other like information. Data and/or graphics may be displayed on one or more user interface components of the output circuitry 884. Output circuitry 884 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the node 850. The output circuitry 884 may also include speakers or other audio emitting devices, printer(s), and/or the like. In some embodiments, the sensor circuitry 872 may be used as the input circuitry 884 (e.g., an image capture device, motion capture device, or the like) and one or more actuators 874 may be used as the output device circuitry 884 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 876 may power the edge computing node 850, although, in examples in which the edge computing node 850 is mounted in a fixed location, it may have a power supply coupled to an electrical grid, or the battery may be used as a backup or for temporary capabilities. The battery 876 may be a lithium ion battery, or a metal-air battery, such as a zinc-air battery, an aluminum-air battery, a lithium-air battery, and the like.

A battery monitor/charger 878 may be included in the edge computing node 850 to track the state of charge (SoCh) of the battery 876, if included. The battery monitor/charger 878 may be used to monitor other parameters of the battery 876 to provide failure predictions, such as the state of health (SoH) and the state of function (SoF) of the battery 876. The battery monitor/charger 878 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 878 may communicate the information on the battery 876 to the processor 852 over the IX 856. The battery monitor/charger 878 may also include an analog-to-digital (ADC) converter that enables the processor 852 to directly monitor the voltage of the battery 876 or the current flow from the battery 876. The battery parameters may be used to determine actions that the edge computing node 850 may perform, such as transmission frequency, mesh network operation, sensing frequency, and the like.

A power block 880, or other power supply coupled to a grid, may be coupled with the battery monitor/charger 878 to charge the battery 876. In some examples, the power block 880 may be replaced with a wireless power receiver to obtain the power wirelessly, for example, through a loop antenna in the edge computing node 850. A wireless battery charging circuit, such as an LTC4020 chip from Linear Technologies of Milpitas, California, among others, may be included in the battery monitor/charger 878. The specific charging circuits may be selected based on the size of the battery 876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 858 may include instructions 882 in the form of software, firmware, or hardware commands to implement the techniques described herein. Although such instructions 882 are shown as code blocks included in the memory 854 and the storage 858, it may be understood that any of the code blocks may be replaced with hardwired circuits, for example, built into an application specific integrated circuit (ASIC).

In an example, the instructions 782 provided via the memory 854, the storage 858, or the processor 852 may be embodied as a non-transitory, machine-readable medium 860 including code to direct the processor 852 to perform electronic operations in the edge computing node 850. The processor 852 may access the non-transitory, machine-readable medium 860 over the IX 856. For instance, the non-transitory, machine-readable medium 860 may be embodied by devices described for the storage 858 or may include specific storage units such as optical disks, flash drives, or any number of other hardware devices. The non-transitory, machine-readable medium 860 may include instructions to direct the processor 852 to perform a specific sequence or flow of actions, for example, as described with respect to the flowchart(s) and block diagram(s) of operations and functionality depicted above. As used herein, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 9:
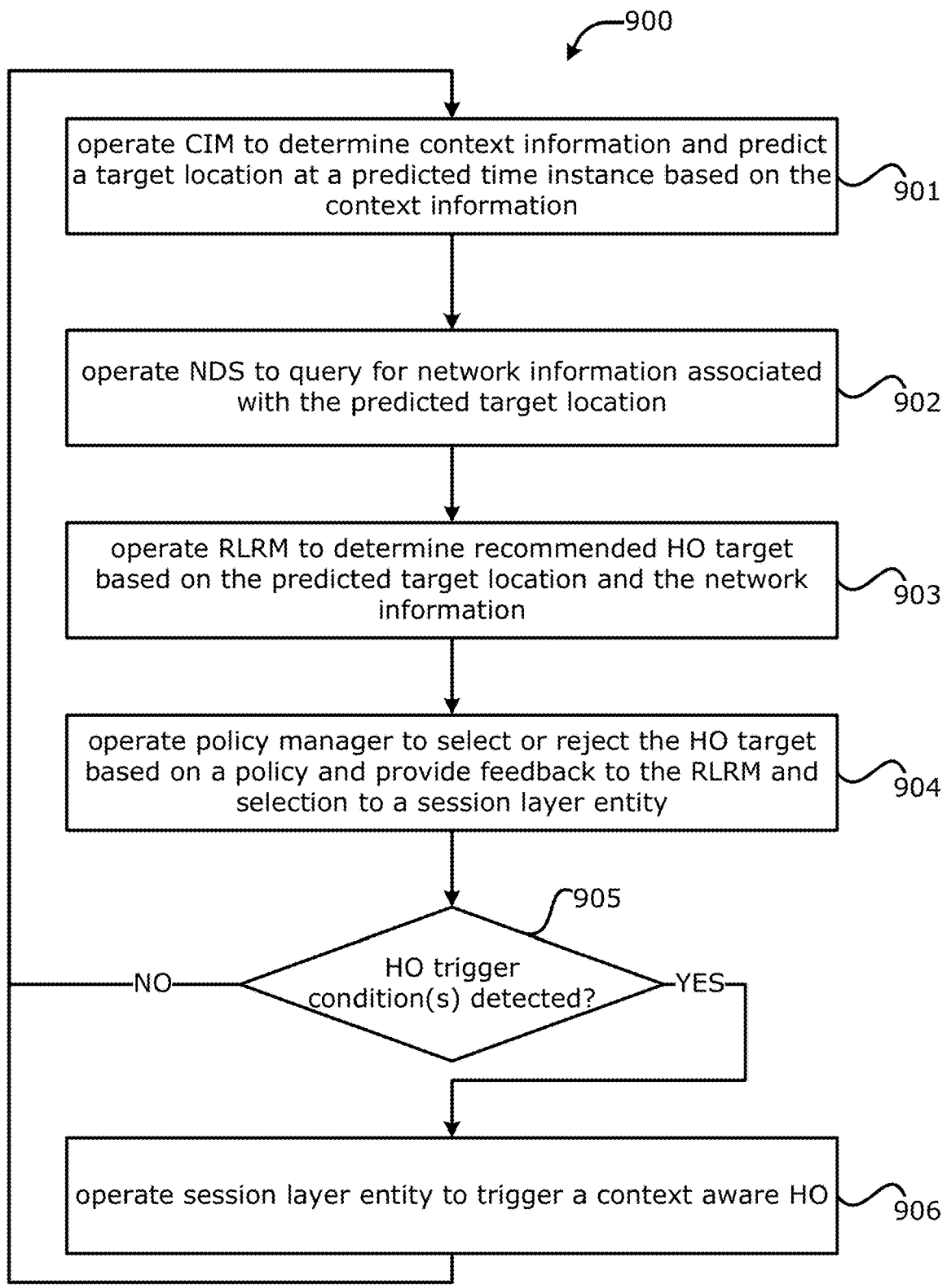
FIG. 9 depicts an example process for practicing various embodiments discussed herein.

The illustrations of FIGS. 7 and 8 are intended to depict a high-level view of components of a varying device, subsystem, or arrangement of an edge computing node. However, some of the components shown may be omitted, additional components may be present, and a different arrangement of the components may occur in other implementations. Further, these arrangements are usable in a variety of use cases and environments, including those discussed herein (e.g., a mobile UE in industrial compute for smart city or smart factory, among many other examples). The respective compute platforms of FIGS. 7 and 8 may support multiple edge instances (e.g., edge clusters) by use of tenant containers running on a single compute platform. Likewise, multiple edge nodes may exist as subnodes running on tenants within the same compute platform. Accordingly, based on available resource partitioning, a single system or compute platform may be partitioned or divided into supporting multiple tenants and edge node instances, each of which may support multiple services and functions—even while being potentially operated or controlled in multiple compute platform instances by multiple owners. These various types of partitions may support complex multi-tenancy and many combinations of multi-stakeholders through the use of an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations 4. Example Implementations FIG. 9 illustrates an example process 900 in accordance with various embodiments. For illustrative purposes, the various operations of process 900 are described as being performed by the computing system 201 or elements thereof. Additionally, the various messages/signaling communicated by the computing system 201 with, for example, NANs 131 and/or repositories 403 may be sent/received over the various interfaces discussed herein with respect to FIGS. 1-8, and using the various mechanisms discussed herein including those discussed herein with respect to FIGS. 1-8. While particular examples and orders of operations are illustrated by FIG. 9, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Process 900 begins at operation 901 where the computing system 201 operates the CIM 230 to determine context information, and predict a target location of the computing system 201 at a predicted time instance based on the context information. At operation 902, the computing system 201 operates the NDS 220 to query for network information about various networks/NANs in or around the predicted target location. At operation 903, the computing system 201 operates the RLRM 210 to determine a recommended HO target at the predicted target location based on the context information and the network information. The HO target may be a target network, RAT type, and/or a specific target NAN 131. At operation 904, the computing system 201 operates the policy manager 205 to select or reject the recommended HO target, provides the selection (or rejection) to the RLRM 210, and provides the selected HO target and/or HO triggering criteria to a session layer entity. At operation 904, the computing system 201 operates the session layer entity to determine whether the HO triggering criteria has/have been met. If the HO triggering criteria has/have not been met, the session layer entity loops back to operation 901 to determine a new system context. In some embodiments, the session layer entity may exit the loop after a predetermined or configured period of time, or in response to receipt of new or updated HO triggering criteria (e.g., in response to changing context information or the like). If the HO triggering criteria have/has been met, the computing system 201 proceeds to operation 905 to operate the session layer entity to trigger a context aware HO from an HO source to the HO target. After performance of operation 905, the computing system 201 may repeat or end process 900.

Additional examples of the presently described method, system, and device embodiments include the following, non-limiting configurations. Each of the non-limiting examples may stand on its own, or may be combined in any permutation or combination with any one or more of the other examples provided below or throughout the present disclosure.

Example A01 includes a method for performing context aware handovers (HOs), the method comprising: determining, by a context inference model (CIM), context information of a computing device; predicting, by the CIM, a target location of the computing device at a predicted time instance based on the context information; determining, by a Reinforcement Learning Recommendation Model (RLRM), a recommended HO target at the predicted target location based on the context information; and initiating, by a session layer entity in response to detection of an HO trigger event, an HO to the HO target using a RAT interface among one or more RAT interfaces of the computing device associated with a RAT of the HO target (the "target RAT interface"); the HO target having or being associated with a same RAT as the target RAT interface.

Example A02 includes the method of example A01 and/or some other example(s) herein, further comprising: querying, by a network discovery service (NDS), a network repository for network information associated with the predicted target location, the network information indicating one or more of network connectivity data, quality of service (QoS) parameters, signal measurements, and locations of individual network access nodes (NANs) at or around the predicted target location.

Example A03 includes the method of example A02 and/or some other example(s) herein, further comprising: predicting, by the RLRM, a QoS for the recommended HO target at the predicted location at the predicted time instance based on the network information.

Example A04 includes the method of example A03 and/or some other example(s) herein, wherein predicting the QoS comprises: identifying, by the RLRM, a current state of the computing device and a current reward, the current state is based on the context information, and the current reward is a numerical value obtained in response to a previously recommended HO target; and determining, by the RLRM, the recommended HO target to be one of a set of candidate networks that will maximize a cumulative amount of rewards over a period of time based on the current state and the current reward.

Example A05 includes the method of examples A01-A04 and/or some other example(s) herein, further comprising: selecting, by a policy manager, the HO target according to a policy; and providing, by the policy manager, the selection to the RLRM as a reward for future predictions.

Example A06 includes the method of examples A01-A05 and/or some other example(s) herein, further comprising: determining, by the CIM, the context information using one or more of: system data from one or more hardware elements of the computing device, object detection data based on image data obtained from one or more imaging sensors, and natural language processing data based on audio data captured by one or more audio sensors.

Example A07 includes the method of examples A01-A06 and/or some other example(s) herein, further comprising: determining, by the CIM, a physical location of the computing device using location data obtained from at least one RAT interface of the one or more RAT interfaces, positioning data obtained from positioning circuitry, or sensor data obtained from one or more activity or motion sensors.

Example A08 includes the method of example A07 and/or some other example(s) herein, wherein the target location is a semantic location, and the method further comprises: determining, by the CIM, the semantic location based on the determined physical location and the context information, the semantic location is a location based on a state of the computing device.

Example A09 includes the method of examples A01-A08 and/or some other example(s) herein, wherein the computing device is attached to a HO source via a source RAT interface among the one or more RAT interfaces, and the method further comprising: triggering, by the session layer entity, the source RAT interface to initiate the HO from the HO source to the HO target.

Example A10 includes the method of example A09 and/or some other example(s) herein, comprising: turning on, by the session layer entity, the target RAT interface in response to detection of the HO trigger event.

Example A11 includes the method of examples A09-A10 and/or some other example(s) herein, wherein the HO source and the HO target utilize a same RAT, or the HO source and the HO target utilize different RATs.

Example B01 includes a Reinforcement Learning Recommendation Model (RLRM) for predicting handover targets for context aware handovers, the method comprising: identifying a current state of the computing system, the current state being based on context information of the computing system; identifying a current reward, the current reward is a value obtained in response to a previously recommended HO target; selecting an action from among a set of available actions given the current state and the current reward, the selected action being a recommendation of a handover (HO) target for a context aware handover from an HO source; providing the selected action to a policy manager; and receiving a positive or negative reward from the policy manager based on the selected action.

Example B02 includes the method of example B01 and/or some other example(s) herein, wherein the context information includes a predicted target location, and the method comprises: obtaining network information associated with the predicted target location from a network discovery service (NDS), the network information including one or more of network connectivity data, quality of service (QoS) parameters, signal measurements, and locations of individual network access nodes (NANs) at or around the predicted target location.

Example B03 includes the method of example B02 and/or some other example(s) herein, wherein selecting the action comprises: selecting the HO target from among a set of candidate HO targets based on a predicted QoS to be provided by each candidate HO target of the set of candidate HO targets.

Example B04 includes the method of examples B02-B03 and/or some other example(s) herein, wherein selecting the action comprises: selecting the HO target from among a set of candidate HO targets that will maximize a cumulative amount of rewards over a period of time.

Example B05 includes the method of examples B01-B04 and/or some other example(s) herein, wherein the predicted target location includes a predicted physical location and a semantic location associated with the predicted physical location.

Example B06 includes the method of examples B01-B05 and/or some other example(s) herein, wherein the HO target is a target network, a target RAT, or a target network access node (NAN), the HO source is a source network, a source RAT, or a source NAN, and the HO source and the HO target utilize a same RAT or the HO source and the HO target utilize different RATs.

Example C01 includes a method for facilitating context aware handovers (HOs), the method comprising: providing, by each network access node (NAN) of a plurality of NANs, network connectivity to client computing devices in respective network coverage areas, each NAN of the plurality of NANs provides network connectivity according to at least one radio access technology (RAT); storing, by one or more network repositories communicatively coupled with the plurality of NANs, network information of individual NANs of the plurality of NANs, the network information indicating network parameters of the individual NANs; obtaining, by a client computing device, network connectivity from at least one NAN of the plurality of NANs; operating, by the client computing device, a context inference model (CIM) to determine context information of the client computing device, and predict a target location of the client computing device at a predicted time instance based on the context information; operating, by the client computing device, a network discovery service (NDS) to query the one or more network repositories for network information associated with the predicted target location; operating, by the client computing device, a Reinforcement Learning Recommendation Model (RLRM) to determine a recommended target NAN of the plurality of NANs at the predicted target location based on the context information and the network information; and operating, by the client computing device, a session layer entity to, in response to detection of an HO trigger event, initiate an HO from a source NAN of the plurality of NANs to the target NAN using a target RAT interface of the one or more RAT interfaces associated with the target NAN.

Example C02 includes the method of example C01 and/or some other example(s) herein, wherein the network information includes one or more of network connectivity data of NANs at the predicted target location, quality of service (QoS) parameters of the NANs at the predicted target location, signal measurements of the NANs at the predicted target location, and locations of the NANs at the predicted target location.

Example C03 includes the method of examples C01-C02 and/or some other example(s) herein, further comprising: operating, by the client computing device, the RLRM to: identify a current state of the client computing device and a current reward, the current state is based on the context information, and the current reward is a numerical value obtained in response to a previously recommended target NAN; and determine the recommended target NAN to be one of a set of candidate NANs that will maximize a cumulative amount of rewards over a period of time based on the current state and the current reward.

Example C04 includes the method of examples C01-C03 and/or some other example(s) herein, further comprising: operating, by the client computing device, a policy manager to: select the target NAN according to a policy; and provide the selection to the RLRM as a positive or negative reward for future predictions.

Example C05 includes the method of examples C01-C04 and/or some other example(s) herein, further comprising: operating, by the client computing device, the CIM to determine the context information using one or more of system data from one or more hardware elements of the client computing device, object detection data based on image data obtained from one or more imaging sensors, and natural language processing data based on audio data captured by one or more audio sensors.

Example C06 includes the method of examples C01-C05 and/or some other example(s) herein, further comprising: operating, by the client computing device, the CIM to: determine a physical location of the apparatus using location data obtained from at least one RAT interface of the one or more RAT interfaces, positioning data obtained from positioning circuitry, or sensor data obtained from one or more activity or motion sensors; and determine a semantic location based on the determined physical location and the context information, the semantic location is a location representative of a state of the client computing device.

Example C07 includes the method of examples C01-C06 and/or some other example(s) herein, wherein each NAN of the plurality of NANS is arranged to provide network information to the one or more repositories on a periodic basis or when network information is updated.

Example C08 includes the method of examples C01-C07 and/or some other example(s) herein, wherein the one or more repositories are implemented by one or more of: a centralized cloud computing service, one or more edge compute nodes wherein individual edge compute nodes of the one or more edge compute nodes are co-located with individual NANs of the plurality of NANs, and one or more cellular core network functions or application functions.

Example Z01 may include an apparatus comprising means to perform one or more elements of a method described in or related to any of examples A01-A11, B01-B06, C01-C08, or any other method or process described herein. Example Z02 may include one or more non-transitory computer-readable media comprising instructions to cause an electronic device, upon execution of the instructions by one or more processors of the electronic device, to perform one or more elements of a method described in or related to any of examples A01-A11, B01-B06, C01-C08, or any other method or process described herein. Example Z03 may include an apparatus comprising logic, modules, or circuitry to perform one or more elements of a method described in or related to any of examples A01-A11, B01-B06, C01-C08, or any other method or process described herein. Example Z04 may include a method, technique, or process as described in or related to any of examples A01-A11, B01-B06, C01-C08, or portions or parts thereof. Example Z05 may include an apparatus comprising: one or more processors and one or more computer-readable media comprising instructions that, when executed by the one or more processors, cause the one or more processors to perform the method, techniques, or process as described in or related to any of examples A01-A11, B01-B06, C01-C08, or portions thereof. Example Z06 may include a signal as described in or related to any of examples A01-A11, B01-B06, C01-C08, or portions or parts thereof. Example Z07 may include a datagram, packet, frame, segment, protocol data unit (PDU), or message as described in or related to any of examples A01-A11, B01-B06, C01-C08, or portions or parts thereof, or otherwise described in the present disclosure.

Example Z08 may include a signal encoded with data as described in or related to any of examples A01-A11, B01-B06, C01-C08, or portions or parts thereof, or otherwise described in the present disclosure. Example Z09 may include a signal encoded with a datagram, packet, frame, segment, protocol data unit (PDU), or message as described in or related to any of examples A01-A11, B01-B06, C01-C08, or portions or parts thereof, or otherwise described in the present disclosure. Example Z10 may include an electromagnetic signal carrying computer-readable instructions, wherein execution of the computer-readable instructions by one or more processors is to cause the one or more processors to perform the method, techniques, or process as described in or related to any of examples A01-A11, B01-B06, C01-C08, or portions thereof. Example Z11 may include a computer program comprising instructions, wherein execution of the program by a processing element is to cause the processing element to carry out the method, techniques, or process as described in or related to any of examples A01-A11, B01-B06, C01-C08, or portions thereof. Example Z12 may include a signal in a wireless network as shown and described herein. Example Z13 may include a method of communicating in a wireless network as shown and described herein. Example Z14 may include a system for providing wireless communication as shown and described herein. Example Z15 may include a device for providing wireless communication as shown and described herein. Any of the above-described examples may be combined with any other example (or combination of examples), unless explicitly stated otherwise.

5. Terminology

The terminology used herein is for the purpose of describing particular embodiments only and is not intended to be limiting of the disclosure. The present disclosure has been described with reference to flowchart illustrations and/or block diagrams of methods, apparatus (systems), and/or computer program products according to embodiments of the present disclosure. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

As used herein, the term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory. Specific arrangements of edge computing applications and services accessible via mobile wireless networks (e.g., cellular and WiFi data networks) may be referred to as "mobile edge computing" or "multi-access edge computing", which may be referenced by the acronym "MEC". The usage of "MEC" herein may also refer to a standardized implementation promulgated by the European Telecommunications Standards Institute (ETSI), referred to as "ETSI MEC". Terminology that is used by the ETSI MEC specification is generally incorporated herein by reference, unless a conflicting definition or usage is provided herein.

As used herein, the term "compute node" or "compute device" refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Specific implementations of a compute node may be incorporated into a server, BS, gateway, road side unit, on premise unit, UE or end consuming device, or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. The term "station" or "STA" refers to a logical entity that is a singly addressable instance of a medium access control (MAC) and physical layer (PHY) interface to the wireless medium (WM). The term "wireless medium" or 1M" refers to the medium used to implement the transfer of protocol data units (PDUs) between peer physical layer (PHY) entities of a wireless local area network (LAN).

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

As used herein, the term "access point" or "AP" refers to an entity that contains one station (STA) and provides access to the distribution services, via the wireless medium (WM) for associated STAs. An AP comprises a STA and a distribution system access function (DSAF). As used herein, the term "base station" refers to a network element in a radio access network (RAN), such as a fourth-generation (4G) or fifth-generation (5G) mobile communications network which is responsible for the transmission and reception of radio signals in one or more cells to or from a user equipment (UE). A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved nodeB (eNB) or a next generation nodeB (gNB). In some examples, the base station may operate or include compute hardware to operate as a compute node. However, in many of the scenarios discussed herein, a RAN node or base station may be substituted with an access point (e.g., wireless network access point) or other network access hardware.

As used herein, the term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for edge applications and services, or even local implementations of cloud-like services.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

As used herein, the term "access edge layer" indicates the sub-layer of infrastructure edge closest to the end user or device. For example, such layer may be fulfilled by an edge data center deployed at a cellular network site. The access edge layer functions as the front line of the infrastructure edge and may connect to an aggregation edge layer higher in the hierarchy.

As used herein, the term "aggregation edge layer" indicates the layer of infrastructure edge one hop away from the access edge layer. This layer can exist as either a medium-scale data center in a single location or may be formed from multiple interconnected micro data centers to form a hierarchical topology with the access edge to allow for greater collaboration, workload failover, and scalability than access edge alone.

As used herein, the term "network function virtualization" (or NFV) indicates the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. In some aspects, NFV processing and data storage will occur at the edge data centers that are connected directly to the local cellular site, within the infrastructure edge.

As used herein, the term "virtualized NF" (or VNF) indicates a software-based NF operating on multi-function, multi-purpose compute resources (e.g., x86, ARM processing architecture) which are used by NFV in place of dedicated physical equipment. In some aspects, several VNFs will operate on an edge data center at the infrastructure edge.

As used herein, the term "edge computing" refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership). As used herein, the term "edge compute node" refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" or "edge computing network" generally refer to a distributed architecture, organization, or collection of multiple nodes and devices, and which is organized to accomplish or offer some aspect of services or resources in an edge computing setting.

The term "Internet of Things" or "IoT" refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smart home, smart building and/or smart city technologies), and the like. IoT devices are usually low-power devices without heavy compute or storage capabilities. "Edge IoT devices" may be any kind of IoT devices deployed at a network's edge.

As used herein, the term "cluster" refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

As used herein, the term "radio technology" refers to technology for wireless transmission and/or reception of electromagnetic radiation for information transfer. The term "radio access technology" or "RAT" refers to the technology used for the underlying physical connection to a radio based communication network. The term "V2X" refers to vehicle to vehicle (V2V), vehicle to infrastructure (V2I), infrastructure to vehicle (I2V), vehicle to network (V2N), and/or network to vehicle (N2V) communications and associated radio access technologies.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the term "radio technology" refers to technology for wireless transmission and/or reception of electromagnetic radiation for information transfer. The term "radio access technology" or "RAT" refers to the technology used for the underlying physical connection to a radio based communication network.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, IEEE 802.16 protocol often referred to as Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies including cellular V2X (C-V2X), Wireless Access in Vehicular Environments (WAVE), Dedicated Short Range Communications (DSRC) communication systems such as Intelligent-Transport-Systems (ITS) including the European Intelligent Transport Systems in the 5 GHz frequency band (ITS-G5), ITS-G5B, ITS-G5C, etc., the IEEE 802.11p protocol (which is the layer 1 (L1) and layer 2 (L2) part of WAVE, DSRC, and ITS-G5), and sometimes WiMAX. The term "DSRC" refers to vehicular communications in the 5.9 GHz frequency band that is generally used in the United States, while "ITS-G5" refers to vehicular communications in the 5.9 GHz frequency band in Europe. Since the present embodiments are applicable to any number of different RATs (including-based RATs) that may be used in any geographic or political region, the terms "DSRC" (used, among other regions, in the U.S.) and "ITS-G5" (used, among other regions, in Europe) may be used interchangeably throughout this disclosure. Other RATs may be used for ITS and/or V2X applications such as RATs using UHF and VHF frequencies, Global System for Mobile Communications (GSM), and/or other wireless communication technologies. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The term "localized network" as used herein may refer to a local network that covers a limited number of connected vehicles in a certain area or region. The term "distributed computing" as used herein may refer to computation resources that are geographically distributed within the vicinity of one or more localized networks' terminations. The term "local data integration platform" as used herein may refer to a platform, device, system, network, or element(s) that integrate local data by utilizing a combination of localized network(s) and distributed computation.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. The term "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like. The term "data element" or "DE" refers to a data type that contains one single data. The term "data frame" or "DF" refers to a data type that contains more than one data element in a predefined order.

As used herein, the term "reliability" refers to the ability of a computer-related component (e.g., software, hardware, or network element/entity) to consistently perform a desired function and/or operate according to a specification. Reliability in the context of network communications (e.g., "network reliability") may refer to the ability of a network to carry out communication. Network reliability may also be (or be a measure of) the probability of delivering a specified amount of data from a source to a destination (or sink).

As used herein, the term "interoperability" refers to the ability of stations, UEs, network devices, systems, etc., utilizing one type of communication system (or RAT) to communicate with stations, UEs, devices, etc., utilizing the another type of communication system (or RAT). As used herein, the term "coexistence" refers to sharing or allocating radiofrequency (RF) resources among stations, UEs, network devices, systems, etc., using two or more types of communication systems or RATs.

The term "application" may refer to a complete and deployable package, environment to achieve a certain function in an operational environment. The term "AI/ML application" or the like may be an application that contains some AI/ML models and application-level descriptions. The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure. The term "session" refers to a temporary and interactive information interchange between two or more communicating devices, two or more application instances, between a computer and user, or between any two or more entities or elements.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.). Furthermore, various standards (e.g., 3GPP, ETSI, etc.) may define various message formats, PDUs, containers, frames, etc., as comprising a sequence of optional or mandatory data elements (DEs), data frames (DFs), information elements (IEs), and/or the like. However, it should be understood that the requirements of any particular standard should not limit the embodiments discussed herein, and as such, any combination of containers, frames, DFs, DEs, IEs, values, actions, and/or features are possible in various embodiments, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. An apparatus for context-aware handovers (HOs), the apparatus comprising:
processor circuitry communicatively coupled with one or more Radio Access Technology (RAT) interfaces, the processor circuitry arranged to:
operate a context inference model (CIM) to determine context information of the apparatus, and predict a target location of the apparatus at a predicted time instance based on the context information,
operate a Reinforcement Learning Recommendation Model (RLRM) to determine a recommended target network at the predicted target location based on the context information, and
operate a session layer entity to, in response to detection of an HO trigger event, initiate an HO to the target network using an available RAT interface of the one or more RAT interfaces associated with the target network.

2. The apparatus of claim 1, wherein the processor circuitry is further arranged to operate a network discovery service (NDS) to:
query for network information associated with the predicted target location, the network information indicating one or more of network connectivity data, quality of service (QoS) parameters, signal measurements, and locations of individual network access nodes (NANs) at or around the predicted target location.

3. The apparatus of claim 2, wherein the processor circuitry is further arranged to operate the RLRM to:
predict a QoS for the recommended target network at the predicted location at the predicted time instance based on the network information.

4. The apparatus of claim 3, wherein, to predict the QoS, the processor circuitry is further arranged to operate the RLRM to:
identify a current state of the apparatus and a current reward, wherein the current state is based on the context information, and the current reward is a numerical value obtained in response to a previously recommended target network; and
determine the recommended target network to be one of a set of candidate networks that will maximize a cumulative amount of rewards over a period of time based on the current state and the current reward.

5. The apparatus of claim 1, wherein the processor circuitry is further arranged to operate a policy manager to:
select the target network according to a policy; and
provide the selection to the RLRM as a reward for future predictions.

6. The apparatus of claim 1, wherein the processor circuitry is further arranged to operate the CIM to determine the context information using one or more of:
system data from one or more hardware elements of the apparatus,
object detection data based on image data obtained from one or more imaging sensors, and
natural language processing data based on audio data captured by one or more audio sensors.

7. The apparatus of claim 1, wherein the processor circuitry is further arranged to operate the CIM to:
determine a physical location of the apparatus using location data obtained from at least one RAT interface of the one or more RAT interfaces, positioning data obtained from positioning circuitry, or sensor data obtained from one or more activity or motion sensors.

8. The apparatus of claim 7, wherein the target location is a semantic location, and the processor circuitry is further arranged to operate the CIM to:
determine the semantic location based on the determined physical location and the context information, wherein the semantic location is a location based on a state of the apparatus.

9. The apparatus of claim 1, wherein the apparatus is attached to a source network via a source RAT interface among the one or more RAT interfaces, and the processor circuitry is further arranged to operate the session layer entity to:
trigger the source RAT interface to initiate the HO from the source network to the target network.

10. The apparatus of claim 9, wherein the processor circuitry is further arranged to operate the session layer entity to:
turn on the available RAT interface in response to detection of the HO trigger event.

11. The apparatus of claim 9, wherein the source network and the target network utilize a same RAT, or the source network and the target network utilize different RATs.

12. A system for facilitating context aware handovers (HOs), the system comprising
a plurality of network access nodes (NANs) arranged to provide network connectivity in respective network coverage areas, each NAN of the plurality of NANs provides network connectivity according to at least one radio access technology (RAT);
one or more network repositories communicatively coupled with the plurality of NANs, the one or more network repositories arranged to store network information of individual NANs of the plurality of NANs, the network information indicating network parameters of the individual NANs; and
a client computing device to obtain network connectivity from at least one NAN of the plurality of NANs, the client computing device comprising:
processor circuitry communicatively coupled with one or more RAT interfaces, the processor circuitry arranged to:
operate a context inference model (CIM) to determine context information of the client computing device, and predict a target location of the client computing device at a predicted time instance based on the context information,
operate a network discovery service (NDS) to query for network information associated with the predicted target location,
operate a Reinforcement Learning Recommendation Model (RLRM) to determine a recommended target NAN of the plurality of NANs at the predicted target location based on the context information and the network information, and
operate a session layer entity to, in response to detection of an HO trigger event, initiate an HO from a source NAN of the plurality of NANs to the target NAN using a RAT interface of the one or more RAT interfaces associated with a RAT of the target NAN.

13. The system of claim 12, wherein the network information includes one or more of network connectivity data of NANs at the predicted target location, quality of service (QoS) parameters of the NANs at the predicted target location, signal measurements of the NANs at the predicted target location, and locations of the NANs at the predicted target location.

14. The system of claim 12, wherein the processor circuitry is further arranged to operate the RLRM to:
   identify a current state of the client computing device and a current reward, wherein the current state is based on the context information, and the current reward is a numerical value obtained in response to a previously recommended target NAN; and
   determine the recommended target NAN to be one of a set of candidate NANs that will maximize a cumulative amount of rewards over a period of time based on the current state and the current reward.

15. The system of claim 12, wherein the processor circuitry is further arranged to operate a policy manager to:
   select the target NAN according to a policy; and
   provide the selection to the RLRM as a positive or negative reward for future predictions.

16. The system of claim 12, wherein the processor circuitry is further arranged to operate the CIM to determine the context information using one or more of:
   system data from one or more hardware elements of the client computing device,
   object detection data based on image data obtained from one or more imaging sensors, and
   natural language processing data based on audio data captured by one or more audio sensors.

17. The system of claim 12, wherein the processor circuitry is further arranged to operate the CIM to:
   determine a physical location of the apparatus using location data obtained from at least one RAT interface of the one or more RAT interfaces, positioning data obtained from positioning circuitry, or sensor data obtained from one or more activity or motion sensors; and
   determine a semantic location based on the determined physical location and the context information, wherein the semantic location is a location representative of a state of the client computing device.

18. The system of claim 12, wherein each NAN of the plurality of NANS is arranged to provide network information to the one or more repositories on a periodic basis or when network information is updated.

19. The system of claim 12, wherein the one or more repositories are implemented by one or more of:
   a centralized cloud computing service,
   one or more edge compute nodes wherein individual edge compute nodes of the one or more edge compute nodes are co-located with individual NANs of the plurality of NANs, and
   one or more cellular core network functions or application functions.

* * * * *

UNITED STATES PATENT AND TRADEMARK OFFICE
CERTIFICATE OF CORRECTION

| | | |
|---|---|---|
| PATENT NO. | : 11,963,051 B2 | Page 1 of 1 |
| APPLICATION NO. | : 17/024301 | |
| DATED | : April 16, 2024 | |
| INVENTOR(S) | : Ashwin Umapathy, Akshaya Ravishankar and Sanket Vinod Shingte | |

It is certified that error appears in the above-identified patent and that said Letters Patent is hereby corrected as shown below:

In the Claims

Column 68
Line 34, Claim 12 "….comprising" should read --….comprising:--

Signed and Sealed this
Twentieth Day of August, 2024

Katherine Kelly Vidal
*Director of the United States Patent and Trademark Office*